US011139951B2

(12) United States Patent
Zheng

(10) Patent No.: US 11,139,951 B2
(45) Date of Patent: Oct. 5, 2021

(54) BLOCKCHAIN SYSTEM AND DATA PROCESSING METHOD FOR BLOCKCHAIN SYSTEM

(71) Applicant: Alibaba Group Holding Limited, Grand Cayman (KY)

(72) Inventor: Jieqian Zheng, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 485 days.

(21) Appl. No.: 16/250,956

(22) Filed: Jan. 17, 2019

(65) Prior Publication Data

US 2019/0238311 A1   Aug. 1, 2019

(30) Foreign Application Priority Data

Jan. 26, 2018   (CN) .......................... 201810079036.1

(51) Int. Cl.
| | | |
|---|---|---|
| *H04L 9/00* | (2006.01) | |
| *G06F 21/60* | (2013.01) | |
| *H04L 9/08* | (2006.01) | |
| *H04L 9/06* | (2006.01) | |

(52) U.S. Cl.
CPC .............. *H04L 9/008* (2013.01); *G06F 21/60* (2013.01); *H04L 9/006* (2013.01); *H04L 9/0618* (2013.01); *H04L 9/085* (2013.01); *H04L 2209/38* (2013.01)

(58) Field of Classification Search
CPC ....... H04L 9/008; H04L 9/006; H04L 9/0618; H04L 9/085; G06F 21/60
See application file for complete search history.

(56) References Cited

U.S. PATENT DOCUMENTS

| | | | |
|---|---|---|---|
| 10,320,843 B1 | 6/2019 | Dobrek et al. | |
| 10,341,121 B2* | 7/2019 | Androulaki | ............. H04L 9/008 |
| 10,452,863 B2 | 10/2019 | Miller | |
| 10,579,825 B2* | 3/2020 | Miller | ..................... G06F 16/27 |

(Continued)

FOREIGN PATENT DOCUMENTS

| | | |
|---|---|---|
| CN | 104717067 A | 6/2015 |
| CN | 106549749 A | 7/2017 |
| EP | 2996079 A1 | 3/2016 |

OTHER PUBLICATIONS

Zwattendorfer (Design strategies for a privacy-friendly Austrian eID system in the public cloud, Computers & S e c u r i t y, 2 0 1 5, pp. 178-193) (Year: 2015).*

(Continued)

*Primary Examiner* — Oleg Korsak
(74) *Attorney, Agent, or Firm* — Lee & Hayes, P.C.

(57) ABSTRACT

A blockchain system and a data processing method for a blockchain system are disclosed. The blockchain system includes: a regulatory terminal and a transaction terminal. The regulatory terminal is configured to issue an ID key of the transaction terminal according to an ID of the transaction terminal, and operate on privacy data of the transaction terminal based on the ID key of the transaction terminal. The ID of the transaction terminal is an account address. The transaction terminal is configured to operate on local privacy data according to the ID key of the transaction terminal issued by the regulatory terminal. As such, the privacy protection over the blockchain system is effectively realized and the security is improved.

19 Claims, 9 Drawing Sheets

(56) References Cited

U.S. PATENT DOCUMENTS

| | | | |
|---|---|---|---|
| 10,600,006 B1* | 3/2020 | Wang | G06N 20/00 |
| 10,630,468 B1* | 4/2020 | Wang | G06N 20/00 |
| 10,700,850 B2* | 6/2020 | Ma | G06F 16/2365 |
| 10,749,684 B2* | 8/2020 | Moses | H04L 9/30 |
| 10,755,276 B2* | 8/2020 | Ma | G06Q 20/389 |
| 10,817,872 B2* | 10/2020 | Lin | G06Q 20/0658 |
| 2016/0042335 A1 | 2/2016 | Sugiyama et al. | |
| 2016/0063457 A1 | 3/2016 | Liu et al. | |
| 2017/0289111 A1 | 10/2017 | Voell et al. | |
| 2018/0006826 A1 | 1/2018 | Smith et al. | |
| 2019/0042620 A1 | 2/2019 | Garagiola et al. | |
| 2019/0044703 A1 | 2/2019 | Smith | |
| 2019/0050855 A1 | 2/2019 | Martino et al. | |
| 2019/0074968 A1 | 3/2019 | Liu et al. | |
| 2019/0130114 A1 | 5/2019 | Smith et al. | |
| 2019/0164157 A1* | 5/2019 | Balaraman | H04L 9/3239 |
| 2019/0207751 A1 | 7/2019 | Harvey | |
| 2020/0153627 A1* | 5/2020 | Wentz | H04L 9/3218 |
| 2020/0351098 A1* | 11/2020 | Wentz | H04L 9/3234 |

OTHER PUBLICATIONS

Gao et al, "A 2D barcode-based mobile payment system", retrieved on Mar. 19, 2019 at <<https:l/mafiadoc.com/a-2d-barcode-based-mobile-payment-system_598b288a1723ddcb690d7693.html>>, 2009 Third International Conference on Multimedia and Ubiquitous Enginerring, Jun. 2009, 11 pages.

PCT Search Report and Written Opinion dated Mar. 29, 2019, for PCT Application No. PCT/US2019/014077, 8 pages.

* cited by examiner

BLOCKCHAIN SYSTEM AND DATA PROCESSING METHOD FOR BLOCKCHAIN SYSTEM

CROSS REFERENCE TO RELATED PATENT APPLICATIONS

This application claims priority to Chinese Patent Application No. 201810079036.1 filed on 26 Jan. 2018 and entitled "BLOCKCHAIN SYSTEM AND DATA PROCESSING METHOD FOR BLOCKCHAIN SYSTEM," which is incorporated herein by reference in its entirety.

TECHNICAL FIELD

The present disclosure relates to, but is not limited to, the field of computer data processing technologies, and, more particularly, to blockchain systems and data processing methods for the blockchain systems.

BACKGROUND

Blockchain technology, also referred to as distributed ledger technology, is a decentralized distributed database technology. Blockchain technology is featured with decentralization, openness and transparency, tamper resistance, and trustworthiness.

The conventional blockchain system lacks comprehensive regulation and privacy protection. An address of a user is represented by a series of meaningless numbers, and there is no update mechanism for a user key. For example, after the user creates a new key to transfer assets, the address of the user will become an address generated based on the new key. After the address is changed, the user needs to timely notify a transaction party of the updated address. In addition, the loss of the user key or transfer to an unknown key address will bring losses to the user. Moreover, privacy data or account information of the user is open and transparent without effective privacy protection. A regulator lacks effective means to prevent illegal transactions and cannot timely prevent the loss caused when the key of the user has a security risk or when the user loses the key.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In example embodiments of the present disclosure, a blockchain system and a data processing method for a blockchain system are provided, which may effectively realize the privacy protection of the blockchain system and improve the security of the blockchain system.

In a first aspect, a blockchain system is provided in the example embodiments of the present disclosure. The blockchain system includes a regulatory terminal and a transaction terminal, the regulatory terminal being connected to the transaction terminal. The regulatory terminal is configured to issue an identification (ID) key of the transaction terminal according to an ID of the transaction terminal and operate on privacy data of the transaction terminal based on the ID key of the transaction terminal, and the ID of the transaction terminal is an account address.

The transaction terminal is configured to operate on local privacy data according to the ID key of the transaction terminal issued by the regulatory terminal.

In an example implementation, the transaction terminal may include a user terminal; the privacy data of the transaction terminal may include at least one of the following: a transaction serial number of the user terminal, and a system ID, identity information and asset information corresponding to the user terminal; and the system ID corresponding to the user terminal includes an ID and registration time information of the user terminal; and the regulatory terminal may be configured to operate on the privacy data of the transaction terminal based on the ID key of the transaction terminal in at least one of the following manners:

calculating a secret sharing sub-key of the user terminal from the ID key of the user terminal, and protecting the transaction serial number of the user terminal and the system ID corresponding to the user terminal by secret sharing based on the secret sharing sub-key of the user terminal and a secret sharing sub-key of the regulatory terminal;

protecting the asset information of the user terminal by homomorphic encryption based on the ID key of the user terminal;

calculating a symmetric encryption key of the user terminal from the ID key of the user terminal, and protecting the identity information of the user terminal by symmetric encryption based on the symmetric encryption key of the user terminal;

checking, with the secret sharing sub-key of the regulatory terminal, the transaction serial number and the corresponding system ID of the user terminal protected by secret sharing;

checking, with the ID key of the user terminal, the asset information of the user terminal protected by homomorphic encryption; and calculating a symmetric encryption key of the user terminal from the ID key of the user terminal, and checking, with the symmetric encryption key of the user terminal, the identity information of the user terminal protected by symmetric encryption.

In an example implementation, the user terminal may be configured to calculate the secret sharing sub-key and the symmetric encryption key of the user terminal from the ID key; and operate on the local privacy data based on at least one of the ID key, the secret sharing sub-key and the symmetric encryption key of the user terminal.

In an example implementation, the transaction terminal may include: an issuing institution; the privacy data of the transaction terminal may include at least one of the following: a transaction serial number of the issuing institution, and a system ID and asset information corresponding to the issuing institution; and the system ID corresponding to the issuing institution includes an ID and registration time information of the issuing institution; and the regulatory terminal may be configured to operate on the privacy data of the transaction terminal based on the ID key of the transaction terminal in at least one of the following manners:

calculating a secret sharing sub-key of the issuing institution from an ID key of the issuing institution, and protecting the transaction serial number of the issuing institution and the system ID corresponding to the issuing institution by secret sharing based on the secret sharing sub-key of the issuing institution and a secret sharing sub-key of the regulatory terminal;

protecting the asset information of the issuing institution by homomorphic encryption based on the ID key of the issuing institution;

checking, with the secret sharing sub-key of the regulatory terminal, the transaction serial number and the corresponding system ID of the issuing institution protected by secret sharing; and checking, with the ID key of the issuing institution, the asset information of the issuing institution protected by homomorphic encryption.

In an example implementation, the regulatory terminal may be configured to issue the ID key of the transaction terminal according to the ID of the transaction terminal in the following manner:

determining a system ID corresponding to the transaction terminal according to the ID of the transaction terminal, wherein the system ID includes an ID and registration time information of the transaction terminal; and issuing the ID key of the transaction terminal according to the system ID and a system master key.

In an example implementation, the regulatory terminal may be configured to issue an ID key to the transaction terminal and sign and release registration information after successfully verifying a registration request submitted by the transaction terminal, wherein the registration information includes the privacy data of the transaction terminal protected based on the ID key of the transaction terminal.

In an example implementation, the regulatory terminal may be configured to issue an updated ID key to the transaction terminal and sign and release update information after successfully verifying an update application submitted by the transaction terminal, wherein the update information includes the privacy data of the transaction terminal protected based on the updated ID key.

In an example implementation, the transaction terminal may include a user terminal; the user terminal may be configured to submit the update application to the regulatory terminal after updating a signature certificate from a certificate authority institution, wherein the update application carries at least the following information: an ID of the user terminal, an updated signature certificate, and a signature made on the submitted information according to a signature key of the user terminal.

In an example implementation, the regulatory terminal may be configured to, after receiving a transaction request submitted by the transaction terminal, protect system IDs corresponding to both parties of the transaction and a transaction incremental number of the transaction terminal by secret sharing, and return an encryption result to the transaction terminal;

the transaction terminal may be configured to, after receiving the encryption result, decrypt to confirm IDs of both parties of the transaction, homomorphically encrypt a transaction amount based on ID keys of both parties of the transaction, and submit encrypted information to the regulatory terminal after signing; and the regulatory terminal may be further configured to sign and release complete transaction data after decrypting and successfully verifying the received encrypted information.

In an example implementation, the blockchain system may further include: a chain generating institution configured to, with respect to the data signed and released by the regulatory terminal, add the data released by the regulatory terminal to a data chain after successfully verifying the signature of the regulatory terminal.

In an example implementation, the blockchain system may further include: an audit terminal configured to audit the data which is released by the regulatory terminal and then added by the chain generating institution to the data chain.

In an example implementation, the regulatory terminal may be further configured to update the system master key.

In a second aspect, a data processing method for a blockchain system is provided in the example embodiments of the present disclosure, including:

issuing, by a regulatory terminal, an ID key of a transaction terminal according to an ID of the transaction terminal; and operating on privacy data of the transaction terminal based on the ID key of the transaction terminal, wherein the ID of the transaction terminal is an account address.

In an example implementation, the transaction terminal may include a user terminal; the privacy data of the transaction terminal may include at least one of the following: a transaction serial number of the user terminal, and a system ID, identity information and asset information corresponding to the user terminal; and the system ID corresponding to the user terminal includes an ID and registration time information of the user terminal; and the step of operating on privacy data of the transaction terminal based on the ID key of the transaction terminal may include at least one of the following:

calculating a secret sharing sub-key of the user terminal from the ID key of the user terminal, and protecting the transaction serial number and the corresponding system ID of the user terminal by secret sharing based on the secret sharing sub-key of the user terminal and a secret sharing sub-key of the regulatory terminal;

protecting the asset information of the user terminal by homomorphic encryption based on the ID key of the user terminal;

calculating a symmetric encryption key of the user terminal from the ID key of the user terminal, and protecting the identity information of the user terminal by symmetric encryption based on the symmetric encryption key of the user terminal;

checking, with the secret sharing sub-key of the regulatory terminal, the transaction serial number and the corresponding system ID of the user terminal protected by secret sharing;

checking, with the ID key of the user terminal, the asset information of the user terminal protected by homomorphic encryption; and calculating a symmetric encryption key of the user terminal from the ID key of the user terminal, and checking, with the symmetric encryption key of the user terminal, the identity information of the user terminal protected by symmetric encryption.

In an example implementation, the step of issuing, by the regulatory terminal, an ID key of a transaction terminal according to an ID of the transaction terminal may include:

determining a system ID corresponding to the transaction terminal according to the ID of the transaction terminal, wherein the system ID includes the ID and registration time information of the transaction terminal; and issuing the ID key of the transaction terminal according to the system ID and a system master key.

In an example implementation, before the step of a regulatory terminal issuing an ID key of a transaction terminal according to an ID of the transaction terminal, the method may further include: receiving a registration request submitted by the transaction terminal, and successfully verifying the registration request; and after the step of operating on privacy data of the transaction terminal based on the ID key of the transaction terminal, the method may further include: signing and releasing, by the regulatory terminal, registration information, wherein the registration information includes the privacy data of the transaction terminal protected based on the ID key.

In an example implementation, before the step of a regulatory terminal issuing an ID key of a transaction terminal according to an ID of the transaction terminal, the method may further include: receiving an update application submitted by the transaction terminal, and successfully verifying the update application; and after the step of operating on privacy data of the transaction terminal based on the ID key of the transaction terminal, the method may further include: the regulatory terminal signing and releasing update information, wherein the update information includes the privacy data of the transaction terminal protected based on the updated ID key.

In an example implementation, the transaction terminal may include a user terminal; the update application of the user terminal carries at least the following information: an ID of the user terminal, an updated signature certificate of the user terminal, and a signature made on the submitted information according to a signature key of the user terminal; and the step of the regulatory terminal successfully verifying the update application may include:

successfully verifying, by the regulatory terminal, the updated signature certificate and the signature of the user terminal, verifying through an online certificate status protocol verification service provided by the certificate authority institution that the updated signature certificate is in a valid status, and verifying that the updated signature certificate is matched with a signature certificate prior to update.

In an example implementation, the method may further include: receiving a transaction request submitted by the transaction terminal; and the step of operating on privacy data of the transaction terminal based on the ID key of the transaction terminal may include:

protecting, by the regulatory terminal, system IDs corresponding to both parties of the transaction and a transaction incremental number of the transaction terminal by secret sharing based on a secret sharing sub-key of the transaction terminal and a secret sharing sub-key of the regulatory terminal, and returning an encryption result to the transaction terminal; and obtaining, by the regulatory terminal, through decryption based on the ID key of the transaction terminal, a transaction amount protected by homomorphic encryption after receiving encrypted information submitted by the transaction terminal, and signing and releasing complete transaction data after successfully verifying the encrypted information.

In an example implementation, the method may further include:

authorizing, by the regulatory terminal, a secret sharing sub-key of the regulatory terminal to a chain generating institution, to support the chain generating institution to check data protected by secret sharing; and authorizing, by the regulatory terminal, a system master key and the secret sharing sub-key of the regulatory terminal to an audit terminal, to support the audit terminal to check asset information of the transaction terminal and the data that is protected by secret sharing.

In an example implementation, the method may further include: the regulatory terminal updating the system master key.

In a third aspect, a data processing method for a blockchain system is provided in the example embodiments of the present disclosure, including:

acquiring, by a transaction terminal, an ID key of the transaction terminal issued by a regulatory terminal; and operating, by the transaction terminal, on local privacy data according to the ID key of the transaction terminal, wherein the ID key is obtained from an ID of the transaction terminal, and the ID of the transaction terminal is an account address.

In an example implementation, the transaction terminal may include a user terminal; the local privacy data of the transaction terminal may include at least one of the following: a transaction serial number of the user terminal, and a system ID, identity information and asset information corresponding to the user terminal, wherein the system ID corresponding to the user terminal includes an ID and registration time information of the user terminal; and the step of the transaction terminal operating on local privacy data according to the ID key of the transaction terminal may include at least one of the following:

calculating a secret sharing sub-key of the user terminal from the ID key issued by the regulatory terminal, and checking, with the secret sharing sub-key, the transaction serial number and the corresponding system ID of the user terminal protected by secret sharing;

checking, with the ID key, the asset information of the user terminal protected by homomorphic encryption;

calculating a symmetric encryption key of the user terminal according to the ID key issued by the regulatory terminal, and checking the identity information of the user terminal according to the symmetric encryption key;

protecting the asset information of the user terminal by homomorphic encryption based on the ID key; and calculating a symmetric encryption key of the user terminal from the ID key, and protecting the identity information of the user terminal by symmetric encryption based on the symmetric encryption key of the user terminal.

In an example implementation, the transaction terminal may include an issuing institution; the local privacy data of the transaction terminal may include at least one of the following: a transaction serial number of the issuing institution, and a system ID and asset information corresponding to the issuing institution, wherein the system ID corresponding to the issuing institution includes an ID and registration time information of the issuing institution; and the step of the transaction terminal operating on local privacy data according to the ID key of the transaction terminal may include at least one of the following:

calculating a secret sharing sub-key of the issuing institution according to the ID key issued by the regulatory terminal, and checking, with the secret sharing sub-key, the transaction serial number and the corresponding system ID of the issuing institution protected by secret sharing;

checking, with the ID key, the asset information of the issuing institution protected by homomorphic encryption; and protecting the asset information of the issuing institution by homomorphic encryption based on the ID key.

In an example implementation, before the step of a transaction terminal acquiring an ID key of the transaction terminal issued by a regulatory terminal, the method may further include:

submitting, by the transaction terminal, a registration request to the regulatory terminal; and receiving the ID key of the transaction terminal issued by the regulatory terminal.

In an example implementation, before the step of a transaction terminal acquiring an ID key of the transaction terminal issued by a regulatory terminal, the method may further include:

submitting, by the transaction terminal, an update application to the regulatory terminal; and receiving an updated ID key of the transaction terminal issued by the regulatory terminal.

In an example implementation, the transaction terminal may include a user terminal; and before the user terminal submits an update application to the regulatory terminal, the method may further include: the user terminal applying for a signature certificate update to a certificate authority institution, and receiving an updated signature certificate issued by the certificate authority institution.

In an example implementation, before the step of the transaction terminal operating on local privacy data according to the ID key of the transaction terminal, the method may further include: submitting, by the transaction terminal, a transaction request to the regulatory terminal; and the step of the transaction terminal operating on local privacy data according to the ID key of the transaction terminal may include:

receiving system IDs corresponding to both parties of the transaction and a transaction incremental number of the transaction terminal which are protected by secret sharing and returned by the regulatory terminal; and decrypting to confirm IDs of both parties of the transaction, homomorphically encrypting a transaction amount according to ID keys of both parties of the transaction respectively, and submitting encrypted information to the regulatory terminal after signing, wherein the encrypted information includes: the IDs of both parties of the transaction, a transaction serial number of the transaction terminal, the transaction amount protected by homomorphic encryption, and a signature made on the submitted information according to the signature key of the transaction terminal.

In a fourth aspect, a communication device is provided in the example embodiments of the present disclosure, including: a first memory and a first processor, wherein the first memory is configured to store a data processing program for a blockchain system, and when executed by the first processor, the data processing program implements the steps of the data processing method as provided in the second aspect.

In a fifth aspect, a communication device is provided in the example embodiments of the present disclosure, including: a second memory and a second processor, wherein the second memory is configured to store a data processing program for a blockchain system, and when executed by the second processor, the data processing program implements the steps of the data processing method as provided in the third aspect.

Also, a computer readable medium is further provided in the example embodiments of the present disclosure, which stores a data processing program for a blockchain system, wherein when executed by a processor, the data processing program implements the steps of the data processing method as provided in the second aspect.

In addition, a computer readable medium is further provided in the example embodiments of the present disclosure, which stores a data processing program for a blockchain system, wherein when executed by a processor, the data processing program implements the steps of the data processing method as provided in the third aspect.

In the example embodiments of the present disclosure, the blockchain system includes at least a regulatory terminal and a transaction terminal, the regulatory terminal being connected to the transaction terminal, wherein the regulatory terminal is configured to issue an ID key according to an ID of the transaction terminal and operate on privacy data of the transaction terminal based on the ID key of the transaction terminal, and the ID of the transaction terminal is an account address; and the transaction terminal is configured to operate on local privacy data according to the ID key of the transaction terminal issued by the regulatory terminal. According to the example embodiments of the present disclosure, in the blockchain system, the privacy data is protected effectively by using the ID key determined according to the account address, and the transaction terminal and the regulatory terminal may check the privacy data, thereby ensuring the rights and privacy of the transaction terminal and improving the security of the blockchain system.

In an example implementation, the blockchain system supports smooth and available update of the key and the certificate of the transaction terminal; the account address will not be changed after the key is updated, and the use of the transaction terminal will not be affected. If the key is lost at the transaction terminal, it may be retrieved by key update without causing asset losses, thus improving the security of the blockchain system.

In an example implementation, the regulatory terminal has a regulatory capability, and has means to stop illicit transactions and protect assets. For example, the regulatory terminal may freeze user expenditure or revenues.

In an example implementation, the blockchain system provided in this example embodiment further supports update of the signature certificate of the user terminal and supports update of the system master key.

Certainly, any product that implements the present disclosure does not necessarily need to achieve all the above advantages at the same time.

BRIEF DESCRIPTION OF THE DRAWINGS

The accompanying drawings described here are used to provide further understanding of the present disclosure and constitute a part of the present disclosure. Example embodiments of the present disclosure are used to explain the present disclosure, and do not improperly limit the present disclosure. In the drawings.

DETAILED DESCRIPTION

Figure 1:
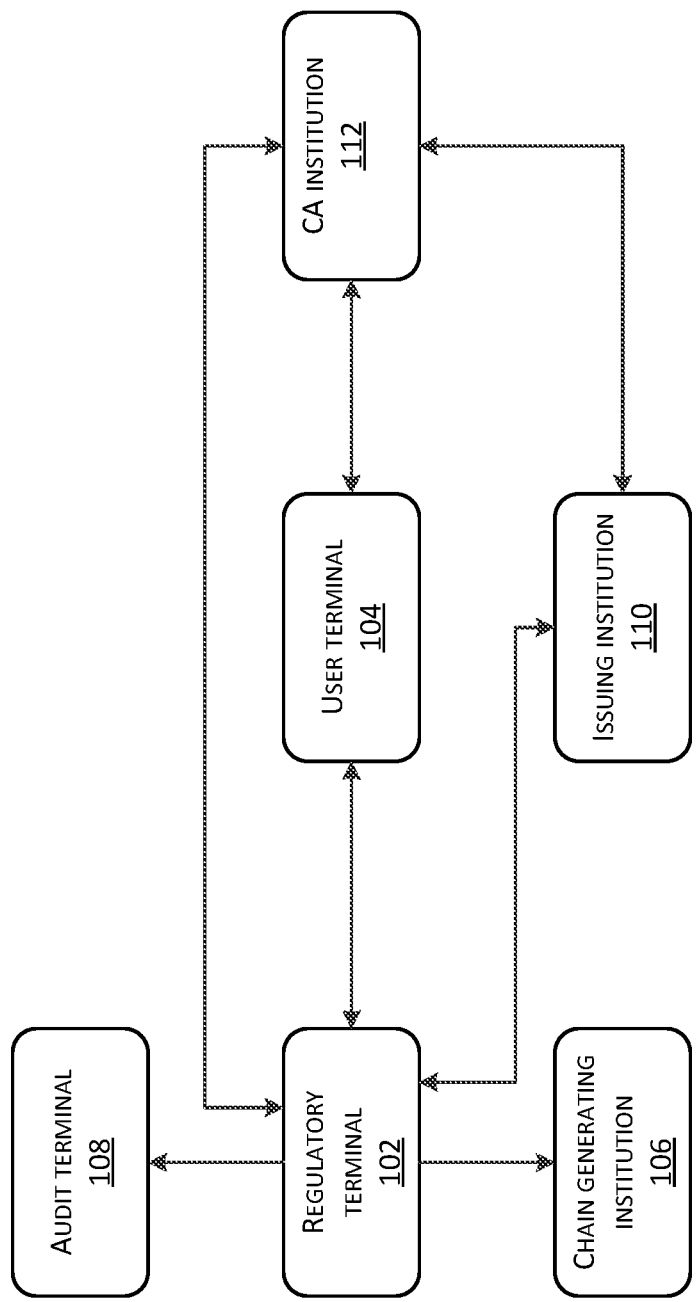
FIG. 1 is a schematic diagram of a blockchain system according to an example embodiment of the present disclosure.

The example embodiments of the present disclosure are described below in detail with reference to the accompanying drawings. It should be understood that the example embodiments described below are used only to illustrate and interpret the present disclosure and are not intended to limit the present disclosure.

It should be noted that the example embodiments of the present disclosure and features in the example embodiments may be combined with each other in the case of no conflict, and all the combinations fall within the protection scope of the present disclosure. In addition, although a logical order is shown in the flowchart, the steps shown or described may be performed in a different order from the order here in some cases.

In implementations, a computing device that performs a data processing method may include one or more processors (CPU, Central Processing Unit), an input/output interface, a network interface and a memory.

The memory may include a volatile memory, a random access memory (RAM) and/or a non-volatile memory and other forms in a computer readable medium, for example, a read-only memory (ROM) or a flash RAM. The memory is an example of the computer readable medium. The memory may include a module 1, a module 2, . . . , and a module N (N is an integer greater than 2).

The computer readable medium includes non-volatile and volatile media as well as removable and non-removable storage media. A storage medium may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic disk storage or other magnetic storage devices, or any other non-transmission media, and may be used to store information accessible to the computing device. According to the definition in this text, the computer readable medium does not include transitory medium, such as modulated data signals and carriers.

Some concepts involved in the present disclosure are first described in the following.

Consensus mechanism: an algorithm for a distributed consensus of blockchain transactions.

ID key: an ID key includes a public key and a private key. The public key is an ID, and the private key is calculated from a system master key and the ID. In the present disclosure, the system master key is managed by a regulatory terminal; a symmetric encryption key and a secret sharing sub-key may be generated from the private key of the ID key through two different one-way irreversible operations respectively.

Additively homomorphic encryption: after a message is encrypted with the public key, an addition operation may be carried out on the ciphertext. An operation output is decrypted with the private key, and the result is consistent with a result obtained by performing addition processing on non-encrypted original data. For example, after values A, B and C are encrypted, the ciphertext is E(A), E(B) and E(C) respectively, which have the following characteristics: if A+B=C, E(A)+E(B)=E(C). In the present disclosure, homomorphic encryption of addition operations may be performed any number of times on the ciphertext based on the ID key.

Secret sharing: when a secret message is split into N pieces in an appropriate way, the secret message may be recovered only by collaboration of the M pieces. In the present disclosure, a secret sharing scheme of optional sub-keys on an elliptic curve is used, and an encryptor (for example, the regulatory terminal) may know N secret sharing sub-keys therein. A (2, N+1) threshold secret sharing algorithm is used. A newly generated shadow sub-key is released with an encryption result, and the secret message may be recovered based on any of the N secret sharing sub-keys. Then shared data to be protected may be encrypted based on a symmetric encryption algorithm by using the secret message as a key. The (2, N+1) threshold secret sharing algorithm indicates that the secret message is split into N+1 shared secret messages, and the secret message may be recovered according to any two or more of the shared messages. In this example, N+1 sub-keys include a newly generated shadow sub-key, and a user terminal having a secret sharing sub-key may recover the secret message according to its own secret sharing sub-key and the shadow sub-key released with the encryption result, and then check shared data by using the secret message.

Symmetric encryption: it means that both parties employing this encryption method perform encryption and decryption by using the same key.

Certificate Authority (CA) institution: namely, a certificate authority center, it is a trusted third party in e-commerce transactions, is responsible for the validity check of public keys in a public key system, and is a trusted third-party identity authentication institution. In the present disclosure, the CA institution performs real-name authentication and issues signature certificates of users and institutions.

Online Certificate Status Protocol (OCSP): it is a service provided by the CA institution to query whether a certificate is in a valid status.

A blockchain system is provided in an example embodiment of the present disclosure, including: a regulatory terminal and a transaction terminal, the regulatory terminal being connected to the transaction terminal, wherein the regulatory terminal is configured to issue an ID key of the transaction terminal according to an ID of the transaction terminal and operate on privacy data of the transaction terminal based on the ID key of the transaction terminal, and the ID of the transaction terminal is an account address; and the transaction terminal is configured to operate on local privacy data according to the ID key of the transaction terminal issued by the regulatory terminal.

As an example, a secret sharing sub-key and a symmetric encryption key of the transaction terminal may be calculated from a private key of an ID key of the transaction terminal through one-way irreversible operations respectively. The secret sharing sub-key of the transaction terminal and a secret sharing sub-key of the regulatory terminal may be used for secret sharing protection. The ID key of the transaction terminal may be used for homomorphic encryption protection. The symmetric encryption key of the transaction terminal may be used for symmetric encryption protection.

As an example, the transaction terminal may include at least one of the following: a user terminal and an issuing institution. If the transaction terminal includes a user terminal, the privacy data of the transaction terminal may include at least one of the following: a transaction serial number of the user terminal, and a system ID, identity information and asset information corresponding to the user terminal; and the system ID corresponding to the user terminal may include an ID and registration time information of the user terminal. If the transaction terminal includes an issuing institution, the privacy data of the transaction terminal may include at least one of the following: a transaction serial number of the issuing institution, and a system ID and asset information corresponding to the issuing institution, wherein the system ID corresponding to the issuing institution may include an ID and registration time information of the issuing institution.

As an example, the blockchain system provided in this example embodiment may further include: a chain generating institution configured to, for data signed and released by the regulatory terminal, add the data released by the regulatory terminal to a data chain after successfully verifying the signature of the regulatory terminal.

As an example, the system provided in this example embodiment may further include: an audit terminal configured to audit the data which is released by the regulatory terminal and then added by the chain generating institution to the data chain.

FIG. 1 is a schematic diagram of a blockchain system according to an example embodiment of the present disclosure. As shown in FIG. 1, the blockchain system provided in this example embodiment includes: a regulatory terminal 102, a user terminal 104, a chain generating institution 106, an audit terminal 108 and an issuing institution 110. The regulatory terminal 102 is connected to the user terminal 104, the chain generating institution 106, the audit terminal 108 and the issuing institution 110 respectively.

As shown in FIG. 1, the blockchain system provided in this example embodiment may be associated with a third-party trusted CA institution 112. The regulatory terminal 102, the user terminal 104 and the issuing institution 110 may be connected to the CA institution 112 respectively. In this example embodiment, the CA institution 112 may perform real-name authentication and issue a signature certificate used in the blockchain system. For each transaction, the regulatory terminal 102 will verify the validity status of the signature certificate through an OCSP or Certificate Revocation List (CRL) service of the CA institution 112 to regulate the transaction process. The CA institution 112 may further provide an update service for the signature certificate.

In this example embodiment, the regulatory terminal, the chain generating institution, the user terminal, the issuing institution and the audit terminal each may be a system that includes one or more communication devices. There may be multiple chain generating institutions, multiple user terminals, multiple issuing institutions and multiple audit terminals. However, the number is not limited in the present disclosure.

In this example embodiment, the regulatory terminal is equivalent to an administrator of blockchain system, which may affect registration and sign-out of users, registration and sign-out of institutions, formulation of transaction rules, issuance of ID keys, issuance of electronic assets, each transaction of the users and so on. However, the regulatory terminal does not have arbitrary permission and cannot complete any transaction and asset issuance alone.

In this example embodiment, the chain generating institution is responsible for a distributed consensus based on a consensus mechanism and is an actual generator of data chains of the blockchain system. The audit terminal may review the data released by the regulatory terminal in the data chains.

A data chain may be generated by chain generating institutions after they reach a consensus by using a Practical Byzantine Fault Tolerance (PBFT) algorithm. This requires a joint signature of multiple chain generating institutions and belongs to an alliance chain consensus mode. Each data block in the data chain may include a control data block, a transaction data block and a block header data.

The control data blocks are mainly information released by the regulatory terminal and may include registration and sign-out of users and institutions, issuance of electronic assets, public parameters of a system master key, transaction rules, voting signatures of chain generating institutions, and so on. Except the identity information of the user terminal and balance information of asset transfer that require encryption protection, most of the data is plaintext, for ease of review. The transaction data block mainly includes actual transaction data. Most of the data is ciphertext, except a transaction serial number, a secret sharing key version number and signature data, which are plaintext. The block header data includes a hash value generated by the control data block, a hash value generated by the transaction data block, a hash value of a current status tree, as well as a block number, a hash value of a previous block header, a timestamp, a joint signature of the consensus algorithm and other information.

In this example embodiment, a status tree is generated by data of all currently valid control data blocks and transaction data blocks. The hash value of the current status tree (generated by using a Merkle Patricia Tree (MPT)) will be recorded in a current block header to ensure that data statuses of all nodes that propagate the data block are consistent. The status tree includes relevant information of a current institution and account balance ciphertext of the issuing institution, relevant information and account balance ciphertext of a current ordinary user, information of transaction rules, identity information of a regulator, public parameters of the ID key, and so on. The account balance ciphertext is protected by additively homomorphic encryption, and operations of adding and subtracting the account balance may be carried out on the ciphertext. Since the public key of the signature certificate of the user terminal, IDs of both parties of the transaction and the transaction serial number on the data chain may be protected by secret sharing, only after decryption of relevant information may a hash value of a correct status tree be generated, thereby preventing brute-force trials for the identities of both parties of the transaction. Only the regulatory terminal, the audit terminal, and the chain generating institution may decrypt all the data protected by secret sharing to recover the correct status tree. The keys involved in this example embodiment all have an update mechanism and the signature certificate has a valid use time range. Therefore, user sign-out and update may be carried out periodically, and user information after sign-out will be removed from the current status tree, thus improving the long-term availability of the system.

In this example embodiment, the issuing institution participates in the issuance of electronic assets. The issuance of electronic assets in the blockchain system is implemented as follows: the regulatory terminal adds plaintext issuance information into a data control block of a data chain and sends the data control block to an issuing institution. The issuance information may include an issuing amount, an ID of the issuing institution, and so on. Then the chain generating institution votes to confirm validation. Voting information is released to the control data blocks, and a ring signature algorithm is adopted for the voting to ensure the anonymity of the voting institution. After validation, the chain generating institution generates identical ciphertext information according to the issuing amount and other information as well as the ID key of the issuing institution by using an additively homomorphic algorithm, and then the additively homomorphic operation is performed on the account balance ciphertext of the issuing institution to complete the issuing process.

Figure 2:
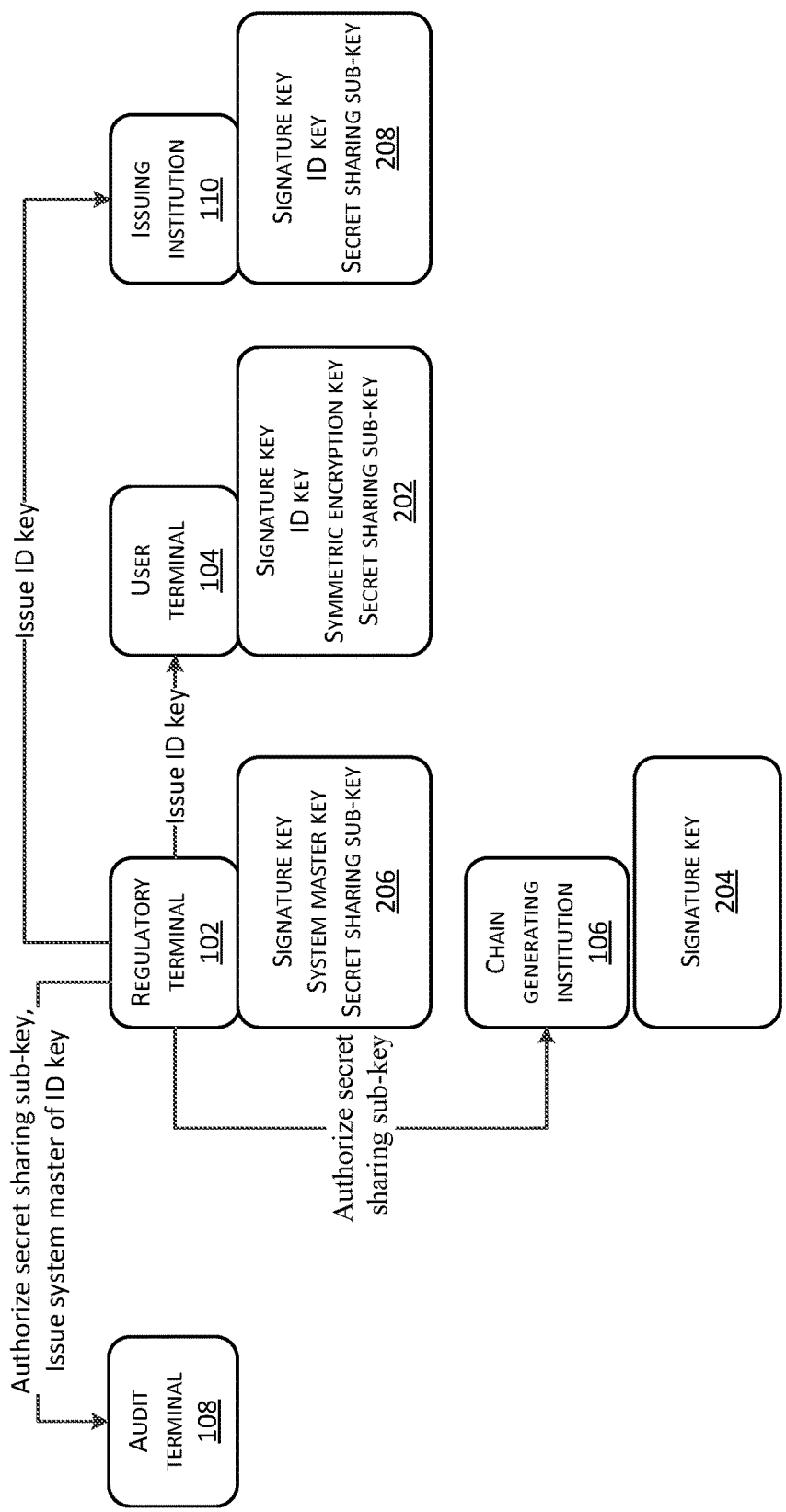
FIG. 2 is a schematic diagram of keys involved in a blockchain system according to an example embodiment of the present disclosure.

FIG. 2 is a schematic diagram of keys involved in a blockchain system according to an example embodiment of the present disclosure. As shown in FIG. 2, the keys involved in the blockchain system provided in this example embodiment may include: a signature key of a user terminal 104, an ID key of the user terminal 104, and a symmetric encryption key and a secret sharing sub-key of the user terminal 104 (collectively known as 202); a signature key 204 of a chain generating institution 106; a signature key of a regulatory terminal 102, a system master key and a secret sharing sub-key of the regulatory terminal 102 (collectively known as 206); a signature key of an issuing institution 110, an ID key of the issuing institution 110 and a secret sharing sub-key of the issuing institution 110 (collectively known as 208).

The ID key may include an ID (public key), and a key (private key) generated based on the ID and the system master key. The symmetric encryption key and the secret sharing sub-key of the user terminal 104 are generated from a private key of the ID key of the user terminal 104 through one-way irreversible operations respectively. The secret sharing sub-key of the issuing institution 110 is generated from a private key of the ID key of the issuing institution 110 through a one-way irreversible operation. As such, both the user terminal 104 and the issuing institution 110 may save only the corresponding signature keys and ID keys, and the secret sharing sub-key or the symmetric encryption key may be generated based on the ID key when necessary. However, this is not limited in the present disclosure.

The signature key in the blockchain system may be generated and protected by each party. After a third-party trusted CA institution may issue a corresponding signature certificate after authenticating the real name of the user terminal or institution. The user terminal or institution may carry out registration after being authenticated by the regulatory terminal.

As shown in FIG. 2, the regulatory terminal 102 is responsible for issuing the ID key of the user terminal 104 and transmitting it to the user terminal 104 in a secure communication manner (for example, encrypted transmission), so that the ID key is safely stored and used by the user terminal 104. The regulatory terminal 102 is also responsible for issuing the ID key of the issuing institution 110 and transmitting it to the issuing institution 110 in a secure communication manner, so that the ID key is safely stored and used by the issuing institution 110.

As an example, the regulatory terminal 102 may determine a corresponding system ID of the user terminal 104 based on the ID of the user terminal 104. The system ID of the user terminal 104 includes the ID and registration time information of the user terminal 104. The ID key of the user terminal 104 is issued according to the system ID and system master key. Similarly, the regulatory terminal 102 may issue the ID key of the issuing institution 110 according to the ID of the issuing institution 110.

An account address selected by the user terminal 104 at the time of registration is a unique ID in the blockchain system and is address information of both parties at the time of transaction. The regulatory terminal 102 will automatically add set date information after the ID submitted by the user terminal 104 to serve as the corresponding system ID, and at the same moment, there is only one valid system ID corresponding to the ID. For example, the ID of the user terminal 104 is Bob, while a system ID such as Bob@20171012 is used at the regulatory terminal 102.

As shown in FIG. 2, the regulatory terminal 102 may authorize the secret sharing sub-key of the regulatory terminal 102 to the chain generating institution 106, and may also authorize to the audit terminal 108 the secret sharing sub-key of the regulatory terminal 102 and the system master key used for issuing the ID key. The audit terminal 108 having the system master key authorized by the regulatory terminal 102 may review data in the transaction data block of the data chain. In order to guarantee the security of key authorization, key authorization may be performed invisibly. A hardware mode only having a secure computing function but no storage function may be used. When started, the chain generating institution 106 or the audit terminal 108 may safely obtain the authorized key from the regulatory terminal 102, and may only decrypt data with the key but cannot obtain the key. After power-off, the authorized key may be automatically cleared to ensure the security of the key.

In this example embodiment, the system master key and the secret sharing sub-key of the regulatory terminal 102 are related to the data confidentiality of the whole blockchain system, and may be safely stored and used by hardware. As an example, the regulatory terminal 102 may only protect its signature key and few system master keys of different versions, as well as few secret sharing sub-keys of different versions, while the real-name identity information of the user terminal 104 is managed by a third-party trusted CA institution, thus simplifying the design of the regulatory terminal 102.

In this example embodiment, a multi-level privacy protection scheme is used in the blockchain system to protect privacy data of the transaction terminal. For example, the privacy data of the user terminal may include: identity information of the user terminal, and system IDs, transaction IDs and asset information (such as account balance and transaction amount) corresponding to both parties of the transaction. As an example, the asset information of the user terminal may be protected by additively homomorphic encryption. Other user terminals and institutions cannot decrypt the data except the user terminal and the regulatory terminal. The key used in additively homomorphic encryption includes: an ID key of the user terminal. The corresponding system IDs (including account addresses) and transaction serial numbers of both parties of the transaction may be protected by secret sharing and may be checked only by both parties of the transaction, the regulatory terminal, the audit terminal and the chain generating institution. The key used by secret sharing may include: secret sharing sub-keys of parties participating in secret sharing. The identity information (for example, a signature certificate) of the user terminal may be encrypted and protected by using the symmetric encryption key of the user terminal. Only the regulatory terminal and the user terminal may decrypt the data and be associated with the third-party trusted CA institution to provide trusted real-name authentication identity information for tracing.

As an example, a secret sharing scheme of optional sub-keys on an elliptic curve may be used for secret sharing. In this example, the regulatory terminal needs to protect shared data, and the regulatory terminal has secret sharing sub-keys of all participants. In this example, N participants need to share a secret. The secret to be shared is first protected by symmetric encryption using a randomly generated random key, and then a (2, N+1) threshold secret sharing algorithm is used to protect the random key by secret sharing. A newly generated shadow sub-key is merged into the encryption result, and then each participant may recover the random key based on any of the N pieces and the newly generated shadow sub-key, thereby decrypting the shared secret protected by symmetric encryption according to the random key.

It should be noted that the institutions in the blockchain system are not categorized as ordinary users, and the identity information of the institutions does not require protection, so a plaintext real-name system may be adopted. The asset information of the issuing institution is similar to that of an ordinary user, and the account balance and transaction amounts may also be protected by additively homomorphic encryption. In other words, the asset information of the issuing institution may be protected by homomorphic encryption based on the ID key of the issuing institution. In addition, the transaction serial number and the corresponding system ID of the issuing institution may be protected by secret sharing based on the secret sharing sub-key of the issuing institution and the secret sharing sub-key of the regulatory terminal.

A registration process of the transaction terminal is exemplified in the following with reference to FIG. 3.

In an example implementation, the regulatory terminal may be configured to issue an ID key to the transaction terminal and sign and release registration information after successfully verifying a registration request submitted by the transaction terminal, wherein the registration information includes privacy data of the transaction terminal protected based on the ID key of the transaction terminal. The chain generating institution may be configured to, after successfully verifying the signature of the regulatory terminal, add registration information released by the regulatory terminal to a data chain.

In an example implementation, for example, the transaction terminal is a user terminal. During user registration, after the user terminal passes real-name authentication at the third-party trusted CA institution, the regulatory terminal reviews and determines registration information of the user terminal. After verifying the signature of the regulatory terminal, the chain generating institution adds the registration information to a status tree, encrypts an initial account balance 0 by additive homomorphism according to the ID key of the user terminal to generate identical ciphertext information, and adds the ciphertext information to the account balance to complete the registration process of the user terminal.

Figure 3:
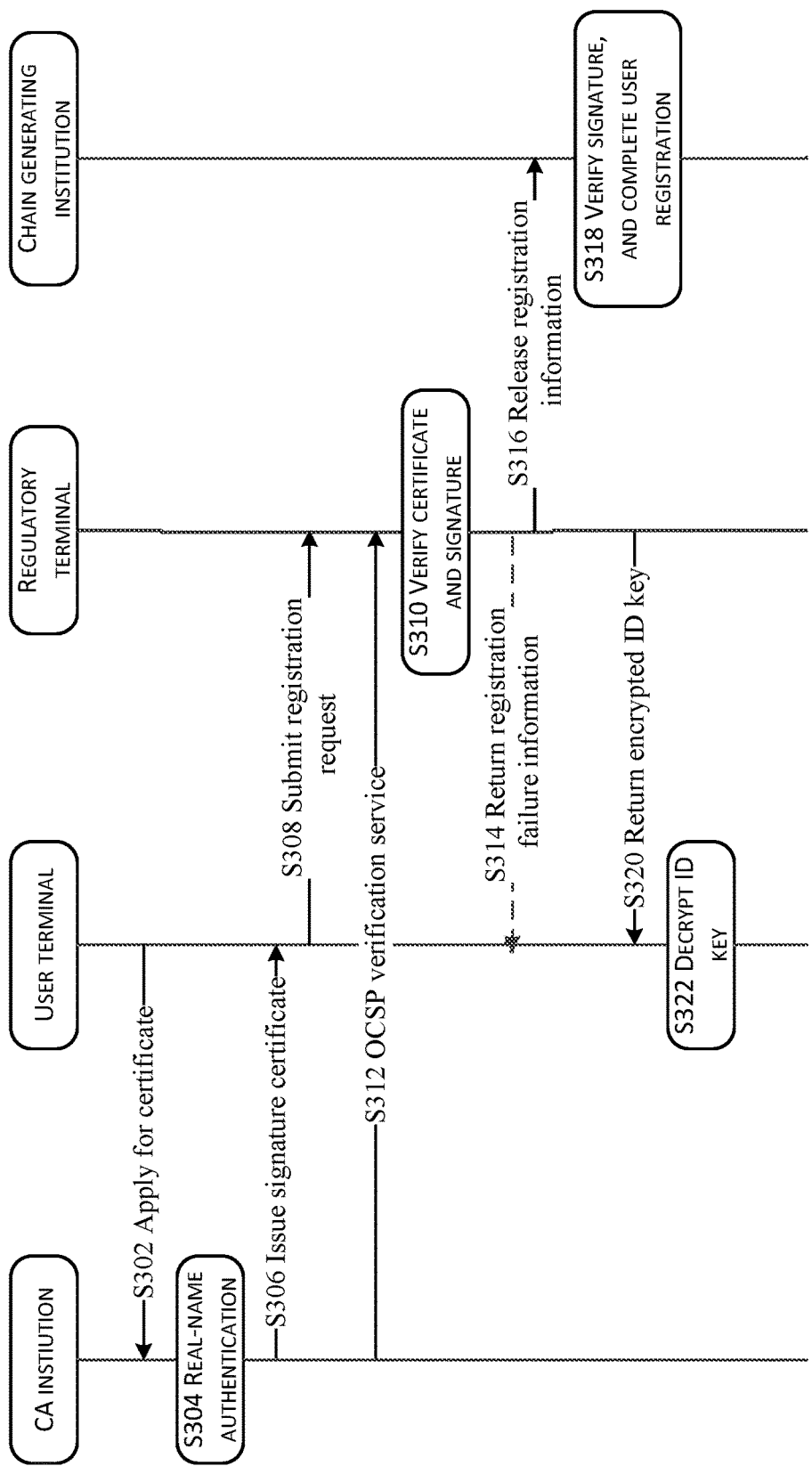
FIG. 3 is a flowchart of user registration according to an example embodiment of the present disclosure.

As shown in FIG. 3, the process of user registration in this example includes the following steps:

S302. A user terminal generates a signature key and applies for a certificate to a CA institution.

S304. The CA institution performs real-name authentication on the user terminal.

S306. After the user terminal passes the real-name authentication, the CA institution issues a signature certificate to the user terminal.

S308. The user terminal submits a registration request, wherein the registration request carries the following information: an ID (for example, Bob) of the user terminal, the signature certificate, a random encrypted public key, and a signature made on request information according to the signature key; the random encrypted public key is provided to the regulatory terminal to encrypt an ID key and transmit the encrypted ID key to the user terminal.

S310. After receiving the registration request, the regulatory terminal verifies the signature certificate and the signature of the user terminal.

There may be various methods for information verification. For example, at S312, the regulatory terminal verifies a validity status of the signature certificate through an OCSP verification service provided by the CA institution.

S314. If the verification fails, the regulatory terminal returns a registration failure message to the user terminal.

S316. If the verification is successful, the regulatory terminal issues an ID key, and generates a symmetric encryption key and a secret sharing sub-key of the user terminal from the ID key according to two different one-way irreversible operations; and then the regulatory terminal signs and releases the registration information of the user terminal.

In this step, the regulatory terminal may determine a system ID corresponding to the user terminal according to the ID of the user terminal, wherein the system ID of the user terminal includes the ID and registration time information of the user terminal; and issue an ID key of the user terminal according to the system ID and a system master key. Then, a symmetric encryption key and a secret sharing sub-key of the user terminal are generated from the ID key of the user terminal through different one-way irreversible operations respectively. The user signature certificate is protected by symmetric encryption based on the symmetric encryption key of the user terminal. Public key information of the signature certificate is protected by secret sharing based on the secret sharing sub-key of the user terminal and a secret sharing sub-key of the regulatory terminal.

The registration information may include: the ID of the user terminal, a version number of the system master key corresponding to the issued ID key of the user terminal, the user signature certificate protected by symmetric encryption, and the public key information of the signature certificate protected by secret sharing.

S318. After verifying the signature of the regulatory terminal, a chain generating institution adds the released registration information to control data blocks, and a status tree is modified by a valid control data block.

S320. The regulatory terminal waits until user information appears in the status tree, and then returns the ID key encrypted with the random encrypted public key to the user terminal.

S322. The user terminal obtains the ID key by decryption with a random private key.

The user terminal may generate a symmetric encryption key and a secret sharing sub-key from the ID key through different one-way irreversible operations respectively, and then perform operations on local privacy data based on at least one of the ID key, the symmetric encryption key, and the secret sharing sub-key.

It should be noted that the registration of an institution is similar to that of an ordinary user, except that the digital certificate added to the control data blocks is plaintext. Therefore, public key information of the certificate is not required, and the registration may take effect only after voting of a current chain generating institution.

A key update process is exemplified in the following with reference to FIG. 4.

In an example implementation, the regulatory terminal may be configured to issue an updated ID key to the transaction terminal and sign and release update information after successfully verifying an update application submitted by the transaction terminal, wherein the update information includes: privacy data of the transaction terminal protected based on the updated ID key. The chain generating institution may be configured to, after successfully verifying the signature of the regulatory terminal, add the update information released by the regulatory terminal to a data chain.

In this example, the transaction terminal is illustrated as a user terminal. The user terminal may be configured to submit an update application to the regulatory terminal after updating a signature certificate from a CA institution, wherein the update application carries at least the following information: an ID of the user terminal, an updated signature certificate, and a signature made on the submitted information according to a signature key of the user terminal.

In this example, the regulatory terminal may be configured to successfully verify the update application submitted by the user terminal in the following manner: successfully verifying the updated signature certificate and the signature of the user terminal, verifying through an OCSP verification service provided by the CA institution that the updated signature certificate is in a valid status, and verifying that the updated signature certificate is matched with a signature certificate prior to update.

In this example, the regulatory terminal may be configured to issue an updated ID key to the user terminal in the following manner: determining a system ID corresponding to the ID of the user terminal according to the ID of the user terminal carried in the update application; and issuing the updated ID key to the user terminal according to the system ID and a system master key.

In this example implementation, the blockchain system completes update of the certificate and the key by creating a new account. The certificate and the key may be updated if the user certificate is close to expiration or the user key is lost. After the update, the system ID corresponding to the user terminal will change, while the ID of the user terminal will not change. The update only includes an increase in the suffix time of the system ID and the process of user sign-out and registration again in the blockchain system. Since the IDs (that is, account addresses) used by both parties of the transaction do not include time information in the actual use process, they are transparent and unchanged for the use of the user terminal.

Figure 4:
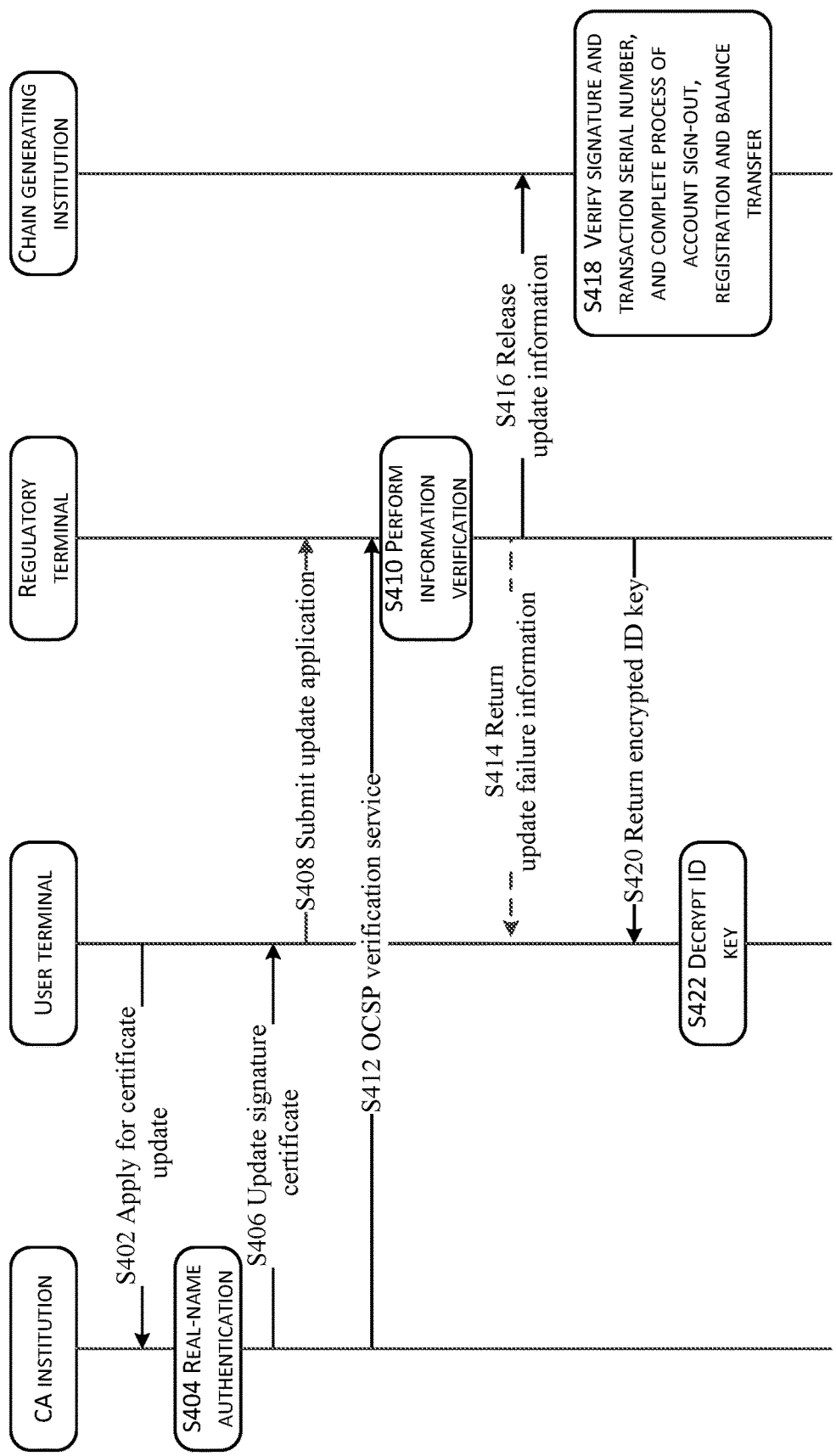
FIG. 4 is a flowchart of update of a signature certificate and a key of a user terminal according to an example embodiment of the present disclosure.

As shown in FIG. 4, the update process of the certificate and the key of the user terminal in this example may include the following steps:

S402. The certificate and the key need to be updated due to the expiration of the user certificate, loss of the key and other reasons, and the user terminal generates a new signature key and applies for certificate update to the CA institution.

S404. The CA institution verifies the real-name identity of the user.

S406. After the user terminal passes real-name authentication, the CA institution updates the signature certificate for the user terminal.

S408. The user terminal submits an update application, wherein the update application may carry the following information: the ID (for example, Bob) of the user terminal, an updated signature certificate, a random encrypted public key, and a signature made on update information according to the signature key.

S410. After receiving the update application, the regulatory terminal verifies the new signature certificate and the signature of the user terminal.

There may be various methods for information verification. For example, at S412, the regulatory terminal verifies, through an OCSP verification service provided by the CA institution, a validity status of the new signature certificate and whether the identity information of the user terminal is identical with the previous one (that is, whether the updated signature certificate is matched with the previous signature certificate).

S414. If the verification fails, the regulatory terminal returns an update failure message to the user terminal.

S416. If the verification is successful, the regulatory terminal generates a new system ID, issues a new ID key, homomorphically encrypts the previous account balance by using the new ID key, and signs and releases update information.

In this step, the regulatory terminal may determine a new system ID corresponding to the user terminal according to the ID of the user terminal, wherein the new system ID of the user terminal includes the ID and updated registration time information of the user terminal; and issue a new ID key of the user terminal according to the system ID and a system master key. Then, a symmetric encryption key and a secret sharing sub-key of the user terminal after the update are generated from the ID key of the user terminal through different one-way irreversible operations respectively. The updated user signature certificate is protected by symmetric encryption based on the symmetric encryption key of the user terminal. Public key information of the updated signature certificate and a transaction serial number are protected by secret sharing based on the secret sharing sub-key of the user terminal and a secret sharing sub-key of the regulatory terminal. The regulatory terminal may decrypt the original account balance by using the original ID key, and then protect the account balance by homomorphic encryption based on the new ID key.

The update information may include: a new ID, a version number of the system master key corresponding to the new ID key issued, a public key of the new signature certificate protected by secret sharing, the new signature certificate protected by symmetric encryption, the transaction serial number protected by secret sharing, and the account balance protected by homomorphic encryption.

S418. The chain generation mechanism verifies the signature of the user terminal and the signature of the regulatory terminal, and verifies whether transaction serial numbers are matched to ensure accuracy and consistency of account transfer; then the released update information is added to control data blocks, and a valid control data block modifies a status tree and at the same time, complete the process of user sign-out, user registration and account balance transfer, removes signed-out user information from the status tree, and resets the transaction serial number.

S420. The regulatory terminal waits until the update information appears in the status tree, and then returns a new ID key encrypted with the random encrypted public key to the user terminal.

S422. The user terminal obtains an updated ID key by decryption with a random private key.

The user terminal may generate an updated symmetric encryption key and an updated secret sharing sub-key from the updated ID key through different one-way irreversible operations respectively, and then operate on local privacy data based on at least one of the updated ID key, symmetric encryption key and secret sharing sub-key.

It should be noted that the certificate update of the institution is similar to the key update, and does not require the voting of the chain generating institution. In addition, in a scenario where the user terminal only signs out but does not update the certificate and the key, the user terminal needs to specify an issuing institution to perform asset transfer and submit a sign-out application and a signature at the same time. After verification, the regulatory terminal will release signed-out account information and a transaction ID (used to indicate a valid transaction behavior in the blockchain system) corresponding to the asset transfer in the control data blocks, enabling the user terminal to trace the asset transfer to the issuing institution. The sign-out of the institution is similar to that of the user, and the assets of the issuing institution may also be transferred to another issuing institution, while the chain generating institution does not have a transaction ID corresponding to the asset transfer process.

Since there is no institution in a status tree of an initiator block, the registration information of the regulatory terminal and the registration information of the chain generating institution, as well as a version number of a system master key of the current regulatory terminal and corresponding public parameter information need to be added to a control data block of the initiator block. The block header only needs to have the signature of the regulatory terminal, and the chain generating institution generates new data blocks by consensus subsequently.

The transaction process is exemplified in the following with reference to FIG. 5.

In an example implementation, the regulatory terminal may be configured to, after receiving a transaction request submitted by the transaction terminal, protect system IDs corresponding to both parties of the transaction and a transaction incremental number of the transaction terminal by secret sharing, and return an encryption result to the transaction terminal. The transaction terminal may be configured to, after receiving the encryption result, decrypt to confirm IDs of both parties of the transaction, homomorphically encrypt a transaction amount based on ID keys of both parties of the transaction, and submit encrypted information to the regulatory terminal after signing. The regulatory terminal may be further configured to sign and release complete transaction data after decrypting and successfully verifying the received encrypted information. The chain generating institution may be configured to add the transaction data released by the regulatory terminal to a data chain after successfully verifying the signature of the transaction terminal and the signature of the regulatory terminal.

In this example, the transaction rules are added to the control data blocks by the regulatory terminal in the form of plaintext and voted into effect by the chain generating institution. The transaction process is described in the following with reference to FIG. 5 by taking a transfer process between user terminals as an example.

Figure 5:
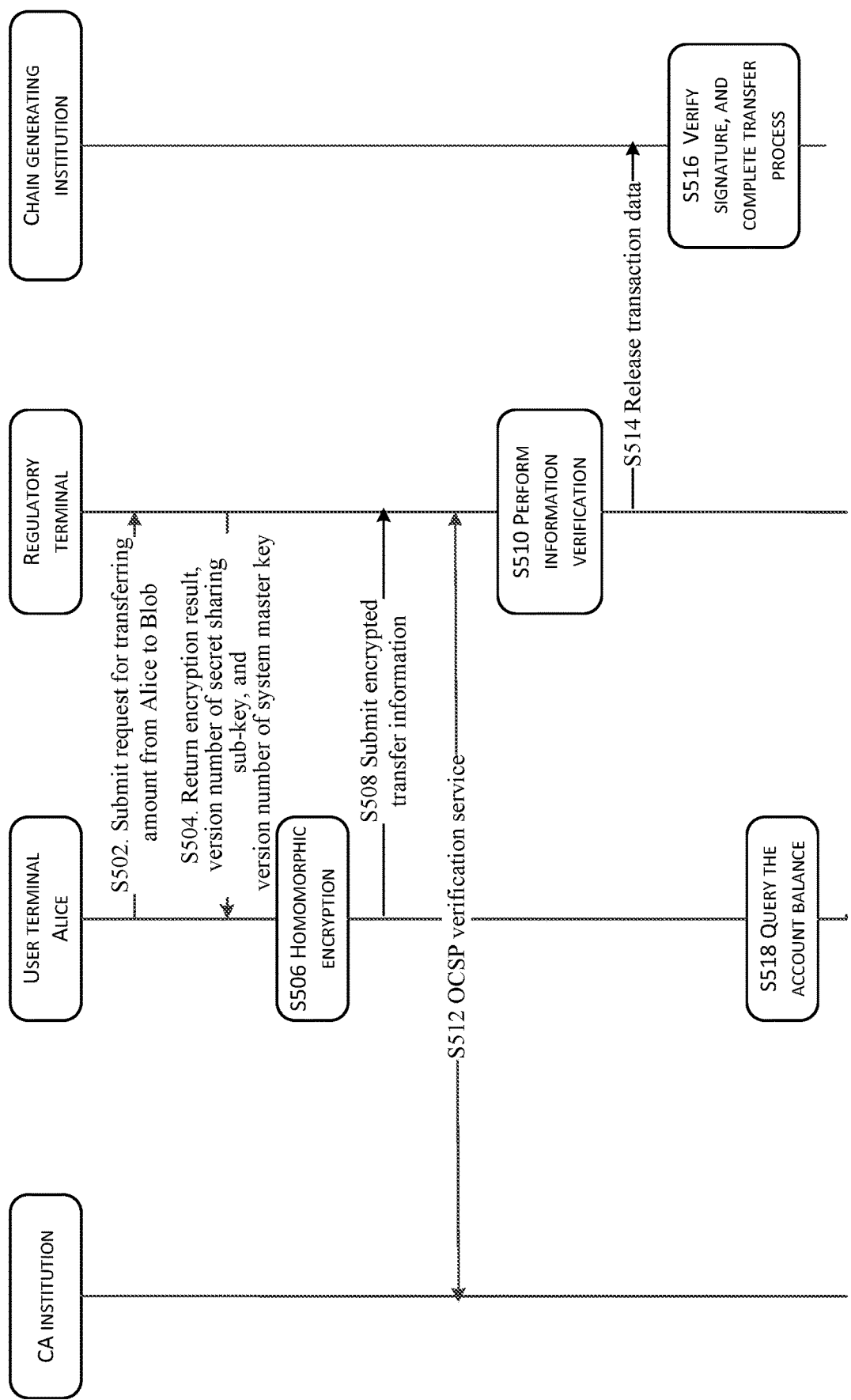
FIG. 5 is an example diagram of a transfer transaction process according to an example embodiment of the present disclosure.

As shown in FIG. 5, a transfer transaction process in this example may include the following steps:

S502. A user terminal Alice submits a transaction request for transferring an amount to a user terminal Bob, wherein the transaction request carries IDs of Alice and Bob.

S504. The regulatory terminal acquires system IDs corresponding to Alice and Bob (for example, Alice@20171012 and Bob@20171010) from a status tree, and protects the system IDs corresponding to Alice and Bob and Alice's transaction serial number+1 (that is, transaction incremental number) by secret sharing based on a current-version secret sharing sub-key of the regulatory terminal and secret sharing sub-keys of Alice and Bob; the regulatory terminal returns an encryption result to the user terminal Alice, wherein only the user terminals Alice and Bob, the regulatory terminal, and the chain generating institution may perform decryption. In addition, the regulatory terminal further returns, to the user terminal Alice, a version number of the secret sharing sub-key of the regulatory terminal, a version number of a system master key used for issuing Alice's ID key and a version number of a system master key used for issuing Bob's ID key.

S506. After acquiring the returned encryption result, the user terminal Alice decrypts to confirm Alice and Bob's IDs, and then encrypts, based on the version number of the system master key, the negative number of an amount to be transferred (−100) and a transfer amount (100) by using a homomorphic encryption algorithm according to a public key of Alice's ID key and a public key of Bob's ID key.

S508. After signing the IDs and transaction serial numbers of both parties of the transaction in a plaintext manner together with other transfer information, the user terminal Alice submits encrypted transfer information.

The encrypted transfer information may include: the IDs of both parties of the transaction, transaction serial numbers and homomorphically encrypted transfer amounts.

S510. The regulatory terminal performs information verification that decrypts the IDs and verifies Alice's signature.

There may be various methods for information verification. For example, at S512, the regulatory terminal verifies, through an OCSP verification service provided by the CA institution. The regulatory terminal separately decrypts an amount protected with the public key of Alice's ID key and an amount protected with the public key of Bob's ID key, calculates whether the sum of the two amounts is 0, then decrypts Alice's account balance in a status tree, verifies whether Alice's account balance is greater than the transfer amount, and compares whether Alice's transaction serial number is incremented to prevent replay.

It is also possible to verify a validity status of Alice and Bob's signature certificates and verify whether the two users are frozen or whether the current operation is a frozen operation, and the like through an OCSP or CRL service provided by the CA institution.

S514. After the verification is successful, the regulatory terminal adds the signature for the entire transaction data and releases the signed transaction data.

The entire transaction data may include: the IDs of both parties of the transaction, the transaction serial numbers, the transaction amounts of both parties, transaction IDs, the version number of the secret sharing sub-key of the regulatory terminal, the signature of the user Alice and the signature of the regulatory terminal.

S516. The chain generating institution verifies the signature of the regulatory terminal and the signature of the user Alice, that is, confirms that the transaction is authorized by Alice and verified by the regulatory terminal and is a legitimate transaction. The chain generating institution adds the released transaction data to a transaction data block after the verification succeeds, and a valid transaction data block modifies the status tree. Additively homomorphic operations may be performed on the ciphertext of Alice's account balance and the ciphertext of Bob's account balance to complete a transfer process.

S518. The user terminal Alice may query the ciphertext of her account balance, use her ID key (private key) to decrypt the ciphertext and check, and find that an amount of 100 has been transferred. Similarly, Bob also may query the ciphertext of his account balance.

It should be noted that the IDs of the user Alice and the user Bob, the transaction serial numbers and the transaction amounts of both parties in the transaction data are all ciphertext; the transaction IDs, the version number of the secret sharing sub-key of the regulatory terminal, the signature of the user Alice, the signature of the regulatory terminal and other information may be plaintext. In order to ensure that the chain generating institution may accurately verify the ID information and transaction serial numbers of both parties, the signature of the user Alice is the signature for the plaintext of the IDs and transaction serial numbers of both parties of the transaction and other transaction data. The signature of the regulatory terminal is the signature for the entire transaction data submitted by Alice, thus ensuring the integrity and tamper resistance of the data. In order to meet more requirements in the future, transaction rules may be added by the regulatory terminal.

In an example implementation, the system master key also has an update mechanism. If the user terminal Alice uses Version 1 of the system master key to generate an ID key and the user terminal Bob uses Version 2 of the system master key to generate an ID key, version numbers of the system master key corresponding to the IDs of both parties of the transaction and public parameter information will be present in the status tree. Therefore, the transaction data only includes the version number of the secret sharing sub-key of the regulatory terminal, and Alice and Bob's account balances are calculated through a homomorphic algorithm using the ID keys issued based on their own system master key version numbers. The accuracy of the result will not be affected even if different homomorphic algorithms are employed, and this also provides support for key update and even algorithm update. In addition, the blockchain system may further continue to support a version number of the system master key in an old version to guarantee smooth transition of users using the old version.

In conclusion, in the example embodiment of the present disclosure, an ID of a transaction terminal is an account address, an ID key of the transaction terminal is issued based on the ID of the transaction terminal and a system master key, then a secret sharing sub-key of the transaction terminal is calculated from the ID key of the transaction terminal, and privacy data of the transaction terminal may be protected by using a homomorphic encryption algorithm based on the ID key and a secret sharing manner based on the secret sharing sub-key, to protect user privacy. This example embodiment supports updates of related certificates, keys and even algorithms, some key updates do not affect transactions between both parties, and an account address of the transaction terminal is not changed after the update, so that users are not affected when using the system, thus improving the security of the system. For example, if a user key is lost, it may be retrieved through a user key update mechanism without causing any loss to the asset. Moreover, in this example embodiment, the regulatory terminal verifies the legitimacy of the transaction and signs the legitimate transaction, to prevent illegal transactions and protect the security of account assets.

Figure 6:
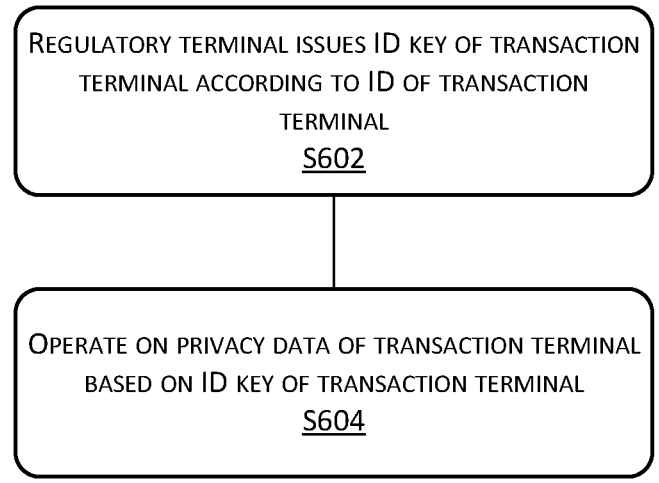
FIG. 6 is a flowchart of a data processing method for a blockchain system according to an example embodiment of the present disclosure.

As shown in FIG. 6, a data processing method for a blockchain system is further provided in an example embodiment of the present disclosure, including the following steps:

S602. A regulatory terminal issues an ID key of a transaction terminal according to an ID of the transaction terminal.

S604. An operation is performed on privacy data of the transaction terminal based on the ID key of the transaction terminal, wherein the ID of the transaction terminal is an account address.

In an example implementation, S602 may include:

determining a system ID corresponding to the transaction terminal according to the ID of the transaction terminal, wherein the system ID includes the ID and registration time information of the transaction terminal; and issuing the ID key of the transaction terminal according to the system ID and a system master key.

In an example implementation, the transaction terminal may include a user terminal; the privacy data of the transaction terminal may include at least one of the following: a transaction serial number of the user terminal, and a system ID, identity information and asset information corresponding to the user terminal; and the system ID corresponding to the user terminal includes an ID and registration time information of the user terminal.

S604 may include at least one of the following:

calculating a secret sharing sub-key of the user terminal from the ID key of the user terminal, and protecting the transaction serial number and the corresponding system ID of the user terminal by secret sharing based on the secret sharing sub-key of the user terminal and a secret sharing sub-key of the regulatory terminal;

protecting the asset information of the user terminal by homomorphic encryption based on the ID key of the user terminal;

calculating a symmetric encryption key of the user terminal from the ID key of the user terminal, and protecting the identity information of the user terminal by symmetric encryption based on the symmetric encryption key of the user terminal;

checking, with the secret sharing sub-key of the regulatory terminal, the transaction serial number and the corresponding system ID of the user terminal protected by secret sharing;

checking, with the ID key of the user terminal, the asset information of the user terminal protected by homomorphic encryption; and calculating a symmetric encryption key of the user terminal from the ID key of the user terminal, and checking, with the symmetric encryption key of the user terminal, the identity information of the user terminal protected by symmetric encryption.

In an example implementation, the transaction terminal may include an issuing institution; the privacy data of the transaction terminal may include at least one of the following: a transaction serial number of the issuing institution, and a system ID and asset information corresponding to the issuing institution, wherein the system ID corresponding to the issuing institution includes an ID and registration time information of the issuing institution.

S604 may include at least one of the following:

calculating a secret sharing sub-key of the issuing institution from the ID key of the issuing institution, and protecting the transaction serial number of the issuing institution and the system ID corresponding to the issuing institution by secret sharing based on the secret sharing sub-key of the issuing institution and a secret sharing sub-key of the regulatory terminal;

protecting the asset information of the issuing institution by homomorphic encryption based on the ID key of the issuing institution;

checking, with the secret sharing sub-key of the regulatory terminal, the transaction serial number and the corresponding system ID of the issuing institution protected by secret sharing; and checking, with the ID key of the issuing institution, the asset information of the issuing institution protected by homomorphic encryption.

In an example implementation, prior to S602, the method of this example embodiment may further include: receiving a registration request submitted by the transaction terminal, and successfully verifying the registration request; and after S604, the method of this example embodiment may further include: the regulatory terminal signing and releasing registration information, wherein the registration information includes the privacy data of the transaction terminal protected based on the ID key.

In an example implementation, prior to S602, the method of this example embodiment may further include: receiving an update application submitted by the transaction terminal, and successfully verifying the update application; and after S604, the method of this example embodiment may further include: the regulatory terminal signing and releasing update information, wherein the update information includes the privacy data of the transaction terminal protected based on the updated ID key.

In the above example implementation, the transaction terminal may include a user terminal; the update application of the user terminal may carry at least the following information: an ID of the user terminal, an updated signature certificate of the user terminal, and a signature made on the submitted information according to a signature key of the user terminal.

The step of the regulatory terminal successfully verifying the update application may include:

the regulatory terminal successfully verifying the updated signature certificate and the signature of the user terminal, verifying through an OCSP verification service provided by the CA institution that the updated signature certificate is in a valid status, and verifying that the updated signature certificate is matched with a signature certificate prior to update.

In an example implementation, the method provided in this example embodiment may further include: receiving a transaction request submitted by the transaction terminal; and S604 may include:

the regulatory terminal protecting system IDs corresponding to both parties of the transaction and a transaction incremental number of the transaction terminal by secret sharing based on a secret sharing sub-key of the transaction terminal and a secret sharing sub-key of the regulatory terminal, and returning an encryption result to the transaction terminal; and the regulatory terminal obtaining, by decryption based on the ID key of the transaction terminal, a transaction amount protected by homomorphic encryption after receiving encrypted information submitted by the transaction terminal, and signing and releasing complete transaction data after successfully verifying the encrypted information.

In an example implementation, the method provided in this example embodiment may further include:

the regulatory terminal authorizing a secret sharing sub-key of the regulatory terminal to a chain generating institution, to support the chain generating institution to check data protected by secret sharing; and the regulatory terminal authorizing a system master key and the secret sharing sub-key of the regulatory terminal to an audit terminal, to support the audit terminal to check asset information of the transaction terminal and the data that is protected by secret sharing.

In an example implementation, the method in this example embodiment may further include: the regulatory terminal updating the system master key.

For related descriptions about the data processing method provided in this example embodiment, reference may be made to the above descriptions about the example embodiment of the blockchain system, and thus details are not described again here.

Figure 7:
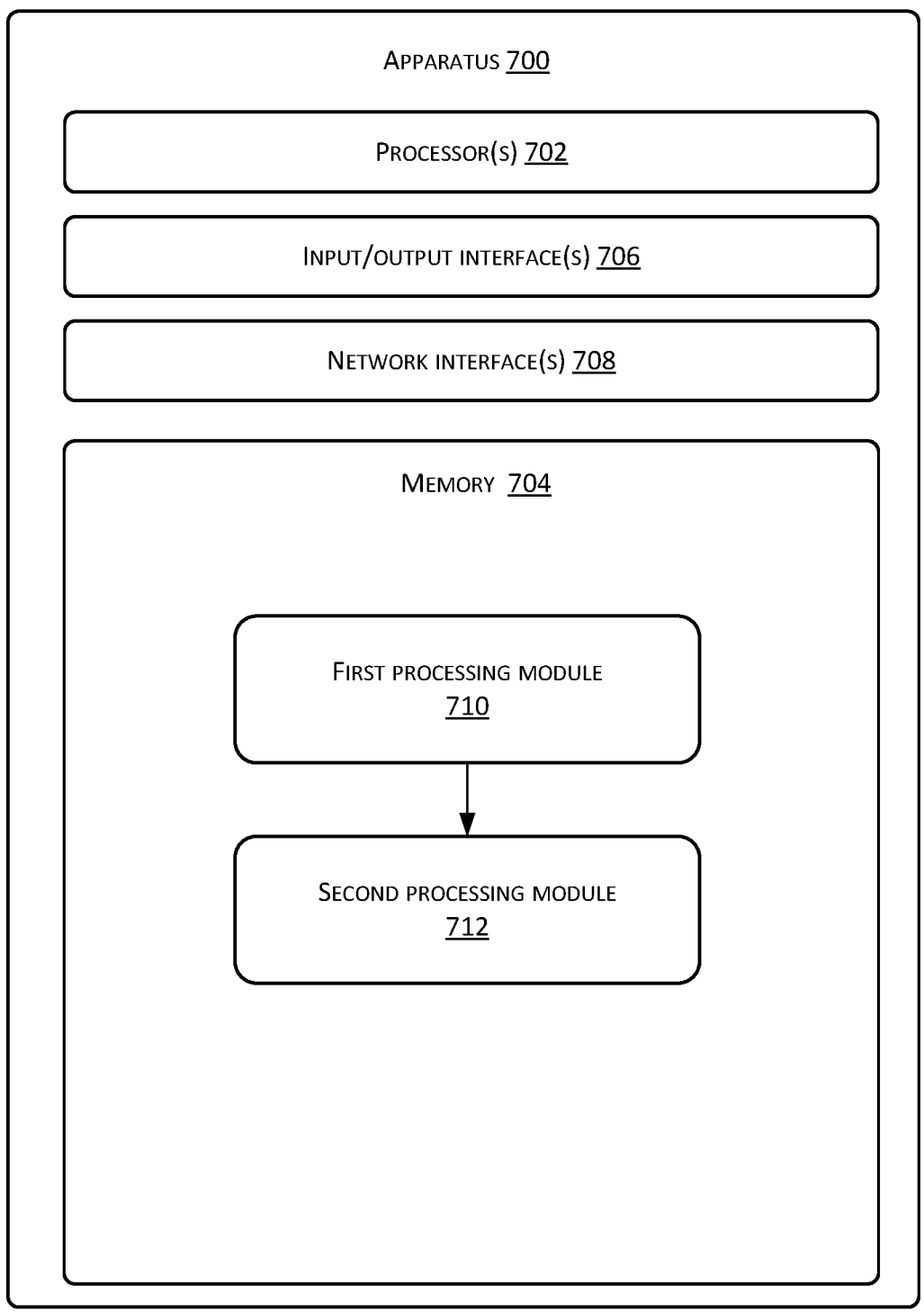
FIG. 7 is a schematic diagram of a data processing apparatus for a blockchain system according to an example embodiment of the present disclosure.

As shown in FIG. 7, a data processing apparatus 700 for a blockchain system is further provided in an example embodiment of the present disclosure. The apparatus 700 is applied to a regulatory terminal.

The apparatus 700 includes one or more processor(s) 702 or data processing unit(s) and memory 704. The apparatus 700 may further include one or more input/output interface(s) 706 and one or more network interface(s) 708. The memory 704 is an example of computer readable medium or media.

The memory 704 may store therein a plurality of modules or units including:

a first processing module 710 configured to issue an ID key of a transaction terminal according to an ID of the transaction terminal; and a second processing module 712 configured to operate on privacy data of the transaction terminal based on the ID key of the transaction terminal, wherein the ID of the transaction terminal is an account address.

As an example, the first processing module 710 may be configured to issue the ID key of the transaction terminal according to the ID of the transaction terminal in the following manner:

determining a system ID corresponding to the transaction terminal according to the ID of the transaction terminal, wherein the system ID includes the ID and registration time information of the transaction terminal; and issuing the ID key of the transaction terminal according to the system ID and a system master key.

As an example, the transaction terminal may include a user terminal; the privacy data of the transaction terminal may include at least one of the following: a transaction serial number of the user terminal, and a system ID, identity information and asset information corresponding to the user terminal; and the system ID corresponding to the user terminal includes an ID and registration time information of the user terminal; and the second processing module 712 may be configured to operate on the privacy data of the transaction terminal based on the ID key of the transaction terminal in at least one of the following manners:

calculating a secret sharing sub-key of the user terminal from the ID key of the user terminal, and protecting the transaction serial number and the corresponding system ID of the user terminal by secret sharing based on the secret sharing sub-key of the user terminal and a secret sharing sub-key of the regulatory terminal;

protecting the asset information of the user terminal by homomorphic encryption based on the ID key of the user terminal;

calculating a symmetric encryption key of the user terminal from the ID key of the user terminal, and protecting the identity information of the user terminal by symmetric encryption based on the symmetric encryption key of the user terminal;

checking, with the secret sharing sub-key of the regulatory terminal, the transaction serial number and the corresponding system ID of the user terminal protected by secret sharing;

checking, with the ID key of the user terminal, the asset information of the user terminal protected by homomorphic encryption; and calculating a symmetric encryption key of the user terminal from the ID key of the user terminal, and checking, with the symmetric encryption key of the user terminal, the identity information of the user terminal protected by symmetric encryption.

For related descriptions about the data processing apparatus provided in this example embodiment, reference may be made to the above descriptions about the data processing method provided in the example embodiment corresponding to FIG. 6, and thus details are not described again here.

In addition, a communication device is further provided in an example embodiment of the present disclosure, including: a first memory and a first processor, wherein the first memory is configured to store a data processing program for a blockchain system, and when executed by the first processor, the data processing program implements the steps of the data processing method provided in the example embodiment corresponding to FIG. 6.

The first processor may include, but is not limited to, a processing apparatus such as a microprocessor (MCU, Microcontroller Unit) or a programmable logic device (FPGA, Field Programmable Gate Array). The first memory may be configured to store a software program and modules of an application, for example, program instructions or modules corresponding to the data processing method in this example embodiment. The first processor runs the software program and modules stored in the first memory to implement various functional applications and data processing, that is, implement the data processing method as described above. The first memory may include a high-speed random access memory, and may also include a nonvolatile memory, for example, one or more magnetic storage devices, flash memories or other nonvolatile solid-state memories. In some examples, the first memory may further include memories remotely disposed relative to the first processor, and these remote memories may be connected to the communication device through a network. Examples of the network include, but are not limited to, the Internet, an intranet, a local area network, a mobile communications network, or a combination thereof.

As an example, the communication device may further include a first communication unit. The first communication unit may receive or send data via a network. In an example, the first communication unit may be a Radio Frequency (RF) module, which is configured to communicate with the Internet wirelessly.

Figure 8:
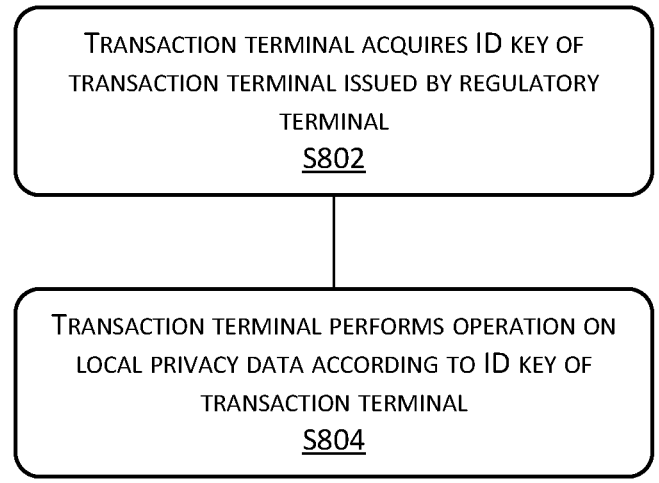
FIG. 8 is a flowchart of another data processing method for a blockchain system according to an example embodiment of the present disclosure.

As shown in FIG. 8, a data processing method for a blockchain system is further provided in an example embodiment of the present disclosure. The method is applied to a transaction terminal and includes the following steps:

S802. The transaction terminal acquires an ID key of the transaction terminal issued by a regulatory terminal.

S804. The transaction terminal performs an operation on local privacy data according to the ID key of the transaction terminal, wherein the ID key is obtained from an ID of the transaction terminal, and the ID of the transaction terminal is an account address.

In an example implementation, the transaction terminal may include a user terminal; the privacy data of the transaction terminal may include at least one of the following: a transaction serial number of the user terminal, and a system ID, identity information and asset information corresponding to the user terminal, wherein the system ID corresponding to the user terminal includes an ID and registration time information of the user terminal.

S804 may include at least one of the following:

calculating a secret sharing sub-key of the user terminal from the ID key issued by the regulatory terminal, and checking, with the secret sharing sub-key, the transaction serial number and the corresponding system ID of the user terminal protected by secret sharing;

checking, with the ID key, the asset information of the user terminal protected by homomorphic encryption;

calculating a symmetric encryption key of the user terminal according to the ID key issued by the regulatory terminal, and checking the identity information of the user terminal according to the symmetric encryption key;

protecting the asset information of the user terminal by homomorphic encryption based on the ID key; and calculating a symmetric encryption key of the user terminal from the ID key, and protecting the identity information of the user terminal by symmetric encryption based on the symmetric encryption key of the user terminal.

In an example implementation, the transaction terminal may include an issuing institution; the local privacy data of the transaction terminal may include at least one of the following: a transaction serial number of the issuing institution, and a system ID and asset information corresponding to the issuing institution, wherein the system ID corresponding to the issuing institution includes an ID and registration time information of the issuing institution; and S804 may include at least one of the following:

calculating a secret sharing sub-key of the issuing institution according to the ID key issued by the regulatory terminal, and checking, with the secret sharing sub-key, the transaction serial number and the corresponding system ID of the issuing institution protected by secret sharing;

checking, with the ID key, the asset information of the issuing institution protected by homomorphic encryption; and protecting the asset information of the issuing institution by homomorphic encryption based on the ID key.

In an example implementation, prior to S802, the method provided in this example embodiment may further include:

the transaction terminal submitting a registration request to the regulatory terminal; and receiving the ID key of the transaction terminal issued by the regulatory terminal.

In an example implementation, prior to S802, the method provided in this example embodiment may further include:

the transaction terminal submitting an update application to the regulatory terminal; and receiving an updated ID key of the transaction terminal issued by the regulatory terminal.

In an example implementation, the transaction terminal may include a user terminal; and before the user terminal submits an update application to the regulatory terminal, the method provided in this example embodiment may further include: the user terminal applying for a signature certificate update to a CA institution and receiving an updated signature certificate issued by the CA institution.

In an example implementation, prior to S804, the method provided in this example embodiment may further include: the transaction terminal submitting a transaction request to the regulatory terminal; and S804 may include:

receiving system IDs corresponding to both parties of the transaction and a transaction incremental number of the transaction terminal which are protected by secret sharing and returned by the regulatory terminal; and decrypting to confirm IDs of both parties of the transaction, homomorphically encrypting a transaction amount according to ID keys of both parties of the transaction respectively, and submitting encrypted information to the regulatory terminal after signing, wherein the encrypted information includes: the IDs of both parties of the transaction, a transaction serial number of the transaction terminal, the transaction amount protected by homomorphic encryption, and a signature made on the submitted information according to the signature key of the transaction terminal.

For related descriptions about the data processing method provided in this example embodiment, reference may be made to the descriptions about the example embodiment of the blockchain system, and thus details are not described again here.

Figure 9:
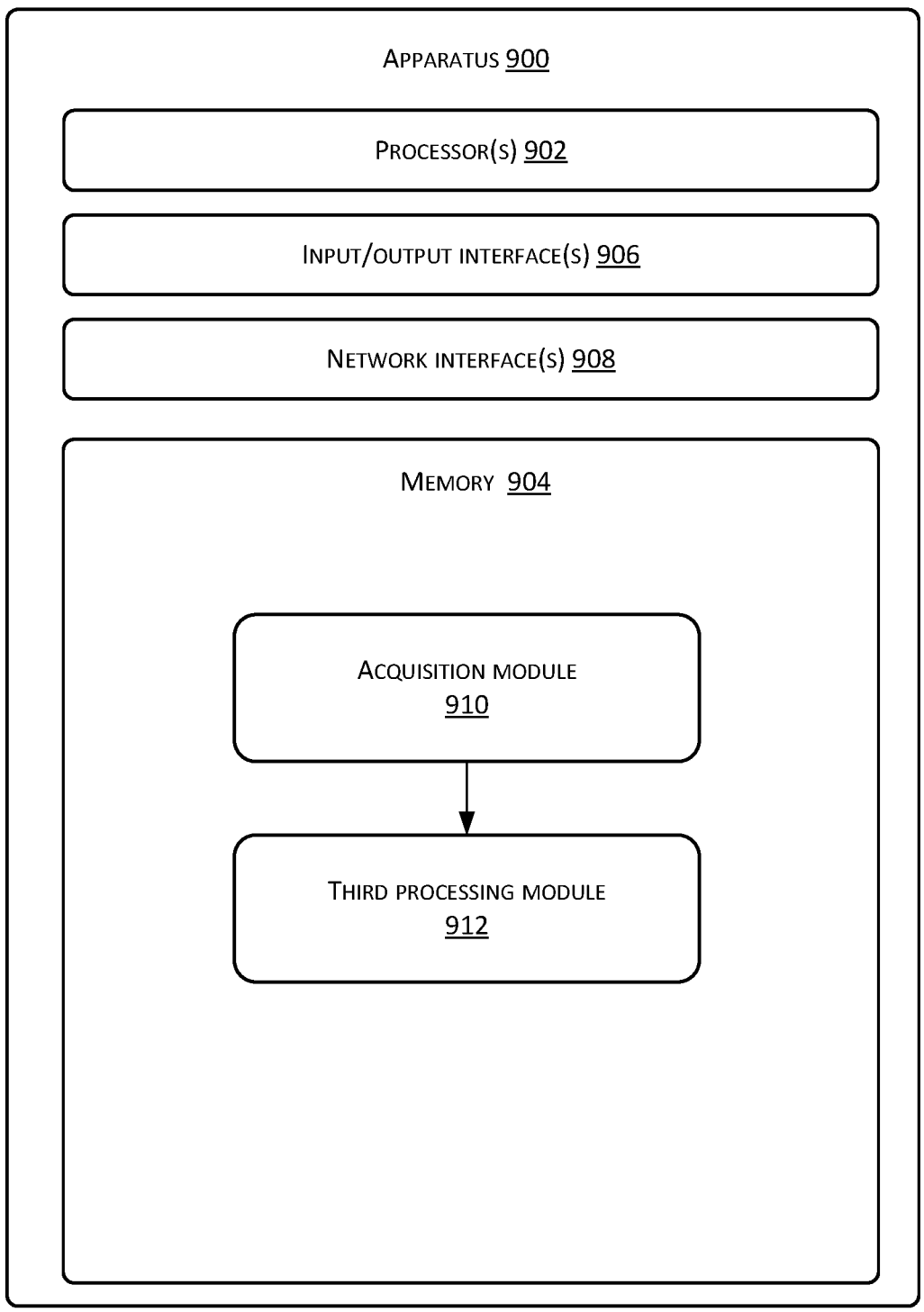
FIG. 9 is a schematic diagram of another data processing apparatus for a blockchain system according to an example embodiment of the present disclosure.

As shown in FIG. 9, a data processing apparatus 900 for a blockchain system is further provided in an example embodiment of the present disclosure. The apparatus 900 is applied to a transaction terminal.

The apparatus 900 includes one or more processor(s) 902 or data processing unit(s) and memory 904. The apparatus 900 may further include one or more input/output interface(s) 906 and one or more network interface(s) 908. The memory 904 is an example of computer readable medium or media.

The memory 904 may store therein a plurality of modules or units including:

an acquisition module 910 configured to acquire an ID key of the transaction terminal issued by a regulatory terminal; and a third processing module 912 configured to operate on local privacy data according to the ID key of the transaction terminal, wherein the ID key is obtained from an ID of the transaction terminal, and the ID of the transaction terminal is an account address.

As an example, the transaction terminal may include a user terminal; the privacy data of the transaction terminal may include at least one of the following: a transaction serial number of the user terminal, and a system ID, identity information and asset information corresponding to the user terminal, wherein the system ID corresponding to the user terminal includes an ID and registration time information of the user terminal; and the third processing module 912 may be configured to operate on the local privacy data according to the ID key of the transaction terminal in at least one of the following manners:

calculating a secret sharing sub-key of the user terminal from the ID key issued by the regulatory terminal, and checking, with the secret sharing sub-key, the transaction serial number and the corresponding system ID of the user terminal protected by secret sharing;

checking, with the ID key, the asset information of the user terminal protected by homomorphic encryption;

calculating a symmetric encryption key of the user terminal according to the ID key issued by the regulatory terminal, and checking the identity information of the user terminal according to the symmetric encryption key;

protecting the asset information of the user terminal by homomorphic encryption based on the ID key; and calculating a symmetric encryption key of the user terminal from the ID key, and protecting the identity information of the user terminal by symmetric encryption based on the symmetric encryption key of the user terminal.

As an example, the transaction terminal may include an issuing institution; the local privacy data of the transaction terminal may include at least one of the following: a transaction serial number of the issuing institution, and a system ID and asset information corresponding to the issuing institution, wherein the system ID corresponding to the issuing institution includes an ID and registration time information of the issuing institution; and the third processing module 912 may be configured to operate on the local privacy data according to the ID key of the transaction terminal in at least one of the following manners:

calculating a secret sharing sub-key of the issuing institution according to the ID key issued by the regulatory terminal, and checking, with the secret sharing sub-key, the transaction serial number and the corresponding system ID of the issuing institution protected by secret sharing;

checking, with the ID key, the asset information of the issuing institution protected by homomorphic encryption; and protecting the asset information of the issuing institution by homomorphic encryption based on the ID key.

For related descriptions about the data processing apparatus provided in this example embodiment, reference may be made to the descriptions about the data processing method provided in the example embodiment corresponding to FIG. 8, and thus details are not described again here.

In addition, a communication device is further provided in an example embodiment of the present disclosure, including: a second memory and a second processor, wherein the second memory is configured to store a data processing program for a blockchain system, and when executed by the second processor, the data processing program implements the steps of the data processing method provided in the example embodiment corresponding to FIG. 8

For the descriptions about the second memory and the second processor, reference may be made to the descriptions about the first memory and the first processor, and thus details are not described again here.

In addition, a computer readable medium is further provided in an example embodiment of the present disclosure. The computer readable medium stores a data processing program for a blockchain system, wherein when executed by a processor, the data processing program implements the steps of the data processing method provided in the example embodiment corresponding to FIG. 6 or FIG. 8.

Those of ordinary skill in the art should understand that all or some of the steps in the method disclosed above as well as functional modules or units in the system and apparatus disclosed above may be implemented as software, firmware, hardware, and appropriate combinations thereof. In a hardware implementation, the division between the functional modules or units mentioned in the above description does not necessarily correspond to the division of physical components. For example, a physical component may have more than one function, or one function or step may be performed by several physical components through collaboration.

Some or all of the components may be implemented as software executed by a processor such as a digital signal processor or microprocessor, or implemented as hardware, or implemented as integrated circuits, such as application-specific integrated circuits. Such software may be distributed over a computer readable medium. The computer readable medium may include computer storage media (or non-temporary media) and communication media (or temporary media). As is well-known to those of ordinary skill in the art, the term "computer storage medium" includes volatile and non-volatile, removable and non-removable media implemented in any method or technology used to store information (such as computer readable instructions, data structures, program modules or other data). The computer readable medium includes, but is not limited to, a RAM, a ROM, an EEPROM, a flash memory or other memory technologies, a CD-ROM, a digital versatile disk (DVD) or other optical disk storage, magnetic cassettes, magnetic tapes, disk storage or other magnetic storage devices, or any other media that may be used to store desired information and accessible to computers. In addition, as is well-known to those of ordinary skill in the art, a communication medium usually includes computer-readable instructions, data structures, program modules, or other data in modulated data signals such as carriers or other transmission mechanisms, and may include any information delivery medium.

The above shows and describes the basic principles and main features of the present disclosure as well as the advantages of the present disclosure. The present disclosure is not limited by the above example embodiments. Described in the above example embodiments and the specification are merely the principles of the present disclosure. On the premise of not departing from the spirit and scope of the present disclosure, the present disclosure will have various changes and improvements, all of which fall within the scope of the present disclosure for which protection is sought.

The present disclosure may further be understood with clauses as follows.

Clause 1. A blockchain system, comprising:

a regulatory terminal and a transaction terminal, the regulatory terminal being connected to the transaction terminal, wherein the regulatory terminal is configured to issue an ID key of the transaction terminal according to an ID of the transaction terminal and operate on privacy data of the transaction terminal based on the ID key of the transaction terminal, and the ID of the transaction terminal is an account address; and the transaction terminal is configured to operate on local privacy data according to the ID key of the transaction terminal issued by the regulatory terminal.

Clause 2. The system of clause 1, wherein the transaction terminal comprises a user terminal;

the privacy data of the transaction terminal comprises at least one of the following: a transaction serial number of the user terminal, and a system ID, identity information and asset information corresponding to the user terminal; and the system ID corresponding to the user terminal comprises an ID and registration time information of the user terminal; and the regulatory terminal is configured to operate on the privacy data of the transaction terminal based on the ID key of the transaction terminal in at least one of the following manners:

calculating a secret sharing sub-key of the user terminal from the ID key of the user terminal, and protecting the transaction serial number of the user terminal and the system ID corresponding to the user terminal by secret sharing based on the secret sharing sub-key of the user terminal and a secret sharing sub-key of the regulatory terminal;

protecting the asset information of the user terminal by homomorphic encryption based on the ID key of the user terminal;

calculating a symmetric encryption key of the user terminal from the ID key of the user terminal, and protecting the identity information of the user terminal by symmetric encryption based on the symmetric encryption key of the user terminal;

checking, with the secret sharing sub-key of the regulatory terminal, the transaction serial number and the corresponding system ID of the user terminal protected by secret sharing;

checking, with the ID key of the user terminal, the asset information of the user terminal protected by homomorphic encryption; and calculating a symmetric encryption key of the user terminal from the ID key of the user terminal, and checking, with the symmetric encryption key of the user terminal, the identity information of the user terminal protected by symmetric encryption.

Clause 3. The system of clause 2, wherein the user terminal is configured to calculate the secret sharing sub-key and the symmetric encryption key of the user terminal from the ID key; and operate on the local privacy data based on at least one of the ID key, the secret sharing sub-key and the symmetric encryption key of the user terminal.

Clause 4. The system of clause 1, wherein the transaction terminal comprises: an issuing institution; the privacy data of the transaction terminal comprises at least one of the following: a transaction serial number of the issuing institution, and a system ID and asset information corresponding to the issuing institution; and the system ID corresponding to the issuing institution comprises an ID and registration time information of the issuing institution; and the regulatory terminal is configured to operate on the privacy data of the transaction terminal based on the ID key of the transaction terminal in at least one of the following manners:

calculating a secret sharing sub-key of the issuing institution from an ID key of the issuing institution, and protecting the transaction serial number of the issuing institution and the system ID corresponding to the issuing institution by secret sharing based on the secret sharing sub-key of the issuing institution and a secret sharing sub-key of the regulatory terminal;

protecting the asset information of the issuing institution by homomorphic encryption based on the ID key of the issuing institution;

checking, with the secret sharing sub-key of the regulatory terminal, the transaction serial number and the corresponding system ID of the issuing institution protected by secret sharing; and checking, with the ID key of the issuing institution, the asset information of the issuing institution protected by homomorphic encryption.

Clause 5. The system of clause 1, wherein the regulatory terminal is configured to issue the ID key of the transaction terminal according to the ID of the transaction terminal in the following manner:

determining a system ID corresponding to the transaction terminal according to the ID of the transaction terminal, wherein the system ID comprises an ID and registration time information of the transaction terminal; and issuing the ID key of the transaction terminal according to the system ID and a system master key.

Clause 6. The system of clause 1, wherein the regulatory terminal is configured to issue an ID key to the transaction terminal and sign and release registration information after successfully verifying a registration request submitted by the transaction terminal, wherein the registration information comprises the privacy data of the transaction terminal protected based on the ID key of the transaction terminal.

Clause 7. The system of clause 1, wherein the regulatory terminal is configured to issue an updated ID key to the transaction terminal and sign and release update information after successfully verifying an update application submitted by the transaction terminal, wherein the update information comprises: the privacy data of the transaction terminal protected based on the updated ID key.

Clause 8. The system of clause 7, wherein the transaction terminal comprises a user terminal; the user terminal is configured to submit the update application to the regulatory terminal after updating a signature certificate from a certificate authority institution, wherein the update application carries at least the following information: an ID of the user terminal, an updated signature certificate, and a signature made on the submitted information according to a signature key of the user terminal.

Clause 9. The system of clause 1, wherein the regulatory terminal is configured to, after receiving a transaction request submitted by the transaction terminal, protect system IDs corresponding to both parties of the transaction and a transaction incremental number of the transaction terminal by secret sharing, and return an encryption result to the transaction terminal;

the transaction terminal is configured to, after receiving the encryption result, decrypt to confirm IDs of both parties of the transaction, homomorphically encrypt a transaction amount based on ID keys of both parties of the transaction, and submit encrypted information to the regulatory terminal after signing; and the regulatory terminal is further configured to sign and release complete transaction data after decrypting and successfully verifying the received encrypted information.

Clause 10. The system of any of clauses 6 to 9, wherein the system further comprises: a chain generating institution configured to, for the data signed and released by the regulatory terminal, add the data released by the regulatory terminal to a data chain after successfully verifying the signature of the regulatory terminal.

Clause 11. The system of clause 10, wherein the system further comprises: an audit terminal configured to audit the data which is released by the regulatory terminal and then added by the chain generating institution to the data chain.

Clause 12. The system of clause 5, wherein the regulatory terminal is further configured to update the system master key.

Clause 13. A data processing method for a blockchain system, comprising:

a regulatory terminal issuing an ID key of a transaction terminal according to an ID of the transaction terminal; and operating on privacy data of the transaction terminal based on the ID key of the transaction terminal, wherein the ID of the transaction terminal is an account address.

Clause 14. The method of clause 13, wherein the transaction terminal comprises a user terminal;

the privacy data of the transaction terminal comprises at least one of the following: a transaction serial number of the user terminal, and a system ID, identity information and asset information corresponding to the user terminal; the system ID corresponding to the user terminal comprises an ID and registration time information of the user terminal; and the step of operating on privacy data of the transaction terminal based on the ID key of the transaction terminal comprises at least one of the following:

calculating a secret sharing sub-key of the user terminal from the ID key of the user terminal, and protecting the transaction serial number and the corresponding system ID of the user terminal by secret sharing based on the secret sharing sub-key of the user terminal and a secret sharing sub-key of the regulatory terminal;

protecting the asset information of the user terminal by homomorphic encryption based on the ID key of the user terminal;

calculating a symmetric encryption key of the user terminal from the ID key of the user terminal, and protecting the identity information of the user terminal by symmetric encryption based on the symmetric encryption key of the user terminal;

checking, with the secret sharing sub-key of the regulatory terminal, the transaction serial number and the corresponding system ID of the user terminal protected by secret sharing;

checking, with the ID key of the user terminal, the asset information of the user terminal protected by homomorphic encryption; and calculating a symmetric encryption key of the user terminal from the ID key of the user terminal, and checking, with the symmetric encryption key of the user terminal, the identity information of the user terminal protected by symmetric encryption.

Clause 15. The method of clause 13, wherein the step of a regulatory terminal issuing an ID key of a transaction terminal according to an ID of the transaction terminal comprises:

determining a system ID corresponding to the transaction terminal according to the ID of the transaction terminal, wherein the system ID comprises the ID and registration time information of the transaction terminal; and issuing the ID key of the transaction terminal according to the system ID and a system master key.

Clause 16. The method of clause 13, wherein before the step of a regulatory terminal issuing an ID key of a transaction terminal according to an ID of the transaction terminal, the method further comprises: receiving a registration request submitted by the transaction terminal, and successfully verifying the registration request; and after the step of operating on privacy data of the transaction terminal based on the ID key of the transaction terminal, the method further comprises: the regulatory terminal signing and releasing registration information, wherein the registration information comprises the privacy data of the transaction terminal protected based on the ID key.

Clause 17. The method of clause 13, wherein before the step of a regulatory terminal issuing an ID key of a transaction terminal according to an ID of the transaction terminal, the method further comprises: receiving an update application submitted by the transaction terminal, and successfully verifying the update application; and after the step of operating on privacy data of the transaction terminal based on the ID key of the transaction terminal, the method further comprises: the regulatory terminal signing and releasing update information, wherein the update information comprises the privacy data of the transaction terminal protected based on the updated ID key.

Clause 18. The method of clause 17, wherein the transaction terminal comprises a user terminal; the update application of the user terminal carries at least the following information: an ID of the user terminal, an updated signature certificate of the user terminal, and a signature made on the submitted information according to a signature key of the user terminal; and the step of the regulatory terminal successfully verifying the update application comprises:

the regulatory terminal successfully verifying the updated signature certificate and the signature of the user terminal, verifying through an online certificate status protocol verification service that the updated signature certificate is in a valid status, and verifying that the updated signature certificate is matched with a signature certificate prior to update.

Clause 19. The method of clause 13, wherein the method further comprises: receiving a transaction request submitted by the transaction terminal; and the step of operating on privacy data of the transaction terminal based on the ID key of the transaction terminal comprises:

the regulatory terminal protecting system IDs corresponding to both parties of the transaction and a transaction incremental number of the transaction terminal by secret sharing based on a secret sharing sub-key of the transaction terminal and a secret sharing sub-key of the regulatory terminal, and returning an encryption result to the transaction terminal; and the regulatory terminal obtaining, by decryption based on the ID key of the transaction terminal, a transaction amount protected by homomorphic encryption after receiving encrypted information submitted by the transaction terminal, and signing and releasing complete transaction data after successfully verifying the encrypted information.

Clause 20. The method of clause 13, wherein the method further comprises:

the regulatory terminal authorizing a secret sharing sub-key of the regulatory terminal to a chain generating institution, to support the chain generating institution to check data protected by secret sharing; and the regulatory terminal authorizing a system master key and the secret sharing sub-key of the regulatory terminal to an audit terminal, to support the audit terminal to check asset information of the transaction terminal and the data that is protected by secret sharing.

Clause 21. The method of clause 15, wherein the method further comprises:

the regulatory terminal updating the system master key.

Clause 22. A data processing method for a blockchain system, comprising:

a transaction terminal acquiring an ID key of the transaction terminal issued by a regulatory terminal; and the transaction terminal operating on local privacy data according to the ID key of the transaction terminal, wherein the ID key is obtained from an ID of the transaction terminal, and the ID of the transaction terminal is an account address.

Clause 23. The method of clause 22, wherein the transaction terminal comprises a user terminal; the local privacy data of the transaction terminal comprises at least one of the following: a transaction serial number of the user terminal, and a system ID, identity information and asset information corresponding to the user terminal, wherein the system ID corresponding to the user terminal comprises an ID and registration time information of the user terminal; and the step of the transaction terminal operating on local privacy data according to the ID key of the transaction terminal comprises at least one of the following:

calculating a secret sharing sub-key of the user terminal from the ID key issued by the regulatory terminal, and checking, with the secret sharing sub-key, the transaction serial number and the corresponding system ID of the user terminal protected by secret sharing;

checking, with the ID key, the asset information of the user terminal protected by homomorphic encryption;

calculating a symmetric encryption key of the user terminal according to the ID key issued by the regulatory terminal, and checking the identity information of the user terminal according to the symmetric encryption key;

protecting the asset information of the user terminal by homomorphic encryption based on the ID key; and calculating a symmetric encryption key of the user terminal from the ID key, and protecting the identity information of the user terminal by symmetric encryption based on the symmetric encryption key of the user terminal.

Clause 24. The method of clause 22, wherein the transaction terminal comprises an issuing institution; the local privacy data of the transaction terminal comprises at least one of the following: a transaction serial number of the issuing institution, and a system ID and asset information corresponding to the issuing institution, wherein the system ID corresponding to the issuing institution comprises an ID and registration time information of the issuing institution; and the step of the transaction terminal operating on local privacy data according to the ID key of the transaction terminal comprises at least one of the following:

calculating a secret sharing sub-key of the issuing institution according to the ID key issued by the regulatory terminal, and checking, with the secret sharing sub-key, the transaction serial number and the corresponding system ID of the issuing institution protected by secret sharing;

checking, with the ID key, the asset information of the issuing institution protected by homomorphic encryption; and protecting the asset information of the issuing institution by homomorphic encryption based on the ID key.

Clause 25. The method of clause 22, wherein before the step of a transaction terminal acquiring an ID key of the transaction terminal issued by a regulatory terminal, the method further comprises:

the transaction terminal submitting a registration request to the regulatory terminal; and receiving the ID key of the transaction terminal issued by the regulatory terminal.

Clause 26. The method of clause 22, wherein before the step of a transaction terminal acquiring an ID key of the transaction terminal issued by a regulatory terminal, the method further comprises:

the transaction terminal submitting an update application to the regulatory terminal; and receiving an updated ID key of the transaction terminal issued by the regulatory terminal.

Clause 27. The method of clause 26, wherein the transaction terminal comprises a user terminal; and before the user terminal submits an update application to the regulatory terminal, the method further comprises: the user terminal applying for a signature certificate update to a certificate authority institution and receiving an updated signature certificate issued by the certificate authority institution.

Clause 28. The method of clause 22, wherein before the step of the transaction terminal operating on local privacy data according to the ID key of the transaction terminal, the method further comprises: the transaction terminal submitting a transaction request to the regulatory terminal; and the step of the transaction terminal operating on local privacy data according to the ID key of the transaction terminal comprises:

receiving system IDs corresponding to both parties of the transaction and a transaction incremental number of the transaction terminal which are protected by secret sharing and returned by the regulatory terminal; and decrypting to confirm IDs of both parties of the transaction, homomorphically encrypting a transaction amount according to ID keys of both parties of the transaction respectively, and submitting encrypted information to the regulatory terminal after signing, wherein the encrypted information comprises: the IDs of both parties of the transaction, a transaction serial number of the transaction terminal, the transaction amount protected by homomorphic encryption, and a signature made on the submitted information according to the signature key of the transaction terminal.

Clause 29. A communication device, comprising: a first memory and a first processor, wherein the first memory is configured to store a data processing program for a blockchain system, and when executed by the first processor, the data processing program implements the steps of the data processing method of any of clauses 13 to 21.

Clause 30. A communication device, comprising: a second memory and a second processor, wherein the second memory is configured to store a data processing program for a blockchain system, and when executed by the second processor, the data processing program implements the steps of the data processing method of any of clauses 22 to 28.

Clause 31. A computer readable medium, storing a data processing program for a blockchain system, wherein when executed by a processor, the data processing program implements the steps of the data processing method of any of clauses 13 to 21.

Clause 32. A computer readable medium, storing a data processing program for a blockchain system, wherein when executed by a processor, the data processing program implements the steps of the data processing method of any of clauses 22 to 28.

What is claimed is:

1. A system comprising:
a regulatory terminal that includes one or more first processors and first memory, and is configured to issue an identification (ID) key of a transaction terminal according to an ID of the transaction terminal and operate on privacy data of the transaction terminal based on the ID key of the transaction terminal, the ID of the transaction terminal including an account address, wherein issuing the ID key of the transaction terminal according to the ID of the transaction terminal comprises:
determining a system ID corresponding to the transaction terminal according to the ID of the transaction terminal, wherein the system ID comprises the ID and registration time information of the transaction terminal; and
issuing the ID key of the transaction terminal according to the system ID and a system master key; and
the transaction terminal that includes one or more second processors and second memory, and is configured to operate on local privacy data according to the ID key of the transaction terminal issued by the regulatory terminal.

2. The system of claim 1, wherein:
the transaction terminal includes a user terminal; and
the privacy data of the transaction terminal includes at least one of:
a transaction serial number of the user terminal;
a system ID corresponding to the user terminal, the system ID corresponding to the user terminal including an ID and registration time information of the user terminal;
identity information corresponding to the user terminal; and
asset information corresponding to the user terminal.

3. The system of claim 2, wherein:
the regulatory terminal is configured to operate on the privacy data of the transaction terminal based on the ID key of the transaction terminal in at least a following manner:
calculating a secret sharing sub-key of the user terminal from the ID key of the user terminal; and
protecting the transaction serial number of the user terminal and the system ID corresponding to the user terminal by secret sharing based on the secret sharing sub-key of the user terminal and a secret sharing sub-key of the regulatory terminal.

4. The system of claim 2, wherein:
the regulatory terminal is configured to operate on the privacy data of the transaction terminal based on the ID key of the transaction terminal in at least a following manner:
protecting the asset information of the user terminal by homomorphic encryption based on the ID key of the user terminal.

5. The system of claim 2, wherein:
the regulatory terminal is configured to operate on the privacy data of the transaction terminal based on the ID key of the transaction terminal in at least a following manner:
calculating a symmetric encryption key of the user terminal from the ID key of the user terminal, and protecting the identity information of the user terminal by symmetric encryption based on the symmetric encryption key of the user terminal.

6. The system of claim 2, wherein:
the regulatory terminal is configured to operate on the privacy data of the transaction terminal based on the ID key of the transaction terminal in at least a following manner:
checking, with a secret sharing sub-key of the regulatory terminal, the transaction serial number and the corresponding system ID of the user terminal protected by secret sharing.

7. The system of claim 2, wherein:
the regulatory terminal is configured to operate on the privacy data of the transaction terminal based on the ID key of the transaction terminal in at least a following manner:
checking, with the ID key of the user terminal, the asset information of the user terminal protected by homomorphic encryption.

8. The system of claim 2, wherein:
the regulatory terminal is configured to operate on the privacy data of the transaction terminal based on the ID key of the transaction terminal in at least a following manner:
calculating a symmetric encryption key of the user terminal from the ID key of the user terminal; and
checking, with the symmetric encryption key of the user terminal, the identity information of the user terminal protected by symmetric encryption.

9. The system of claim 2, wherein:
the user terminal is configured to calculate a secret sharing sub-key and a symmetric encryption key of the user terminal from the ID key; and operate on the local privacy data based on at least one of the ID key, the secret sharing sub-key and the symmetric encryption key of the user terminal.

10. The system of claim 1, wherein:
the transaction terminal being associated with an issuing institution; and
the privacy data of the transaction terminal includes at least one of:
 a transaction serial number of the issuing institution,
 a system ID corresponding to the issuing institution, the system ID corresponding to the issuing institution including an ID and registration time information of the issuing institution; and
 asset information corresponding to the issuing institution.

11. The system of claim 10, wherein:
the regulatory terminal is configured to operate on the privacy data of the transaction terminal based on the ID key of the transaction terminal in a following manner:
calculating a secret sharing sub-key of the issuing institution from an ID key of the issuing institution; and
protecting the transaction serial number of the issuing institution and the system ID corresponding to the issuing institution by secret sharing based on the secret sharing sub-key of the issuing institution and a secret sharing sub-key of the regulatory terminal.

12. The system of claim 10, wherein:
the regulatory terminal is configured to operate on the privacy data of the transaction terminal based on the ID key of the transaction terminal in a following manner:
protecting the asset information of the issuing institution by homomorphic encryption based on the ID key of the issuing institution.

13. The system of claim 10, wherein:
the regulatory terminal is configured to operate on the privacy data of the transaction terminal based on the ID key of the transaction terminal in a following manner:
checking, with a secret sharing sub-key of the regulatory terminal, the transaction serial number and the corresponding system ID of the issuing institution protected by secret sharing.

14. The system of claim 10, wherein:
the regulatory terminal is configured to operate on the privacy data of the transaction terminal based on the ID key of the transaction terminal in a following manner:
checking, with an ID key of the issuing institution, the asset information of the issuing institution protected by homomorphic encryption.

15. The system of claim 1, wherein:
the regulatory terminal is configured to issue an ID key to the transaction terminal and sign and release registration information after successfully verifying a registration request submitted by the transaction terminal, the registration information including the privacy data of the transaction terminal protected based on the ID key of the transaction terminal.

16. The system of claim 1, wherein:
the regulatory terminal is configured to issue an updated ID key to the transaction terminal and sign and release update information after successfully verifying an update application submitted by the transaction terminal, the update information including the privacy data of the transaction terminal protected based on the updated ID key.

17. The system of claim 1, further comprising a chain generating institution configured to, for the data signed and released by the regulatory terminal, add the data released by the regulatory terminal to a data chain after successfully verifying the signature of the regulatory terminal.

18. A method implemented by a regulatory terminal comprising one or more processors and memory, the method comprising:
issuing an ID key of a transaction terminal according to an ID of the transaction terminal, wherein issuing the ID key of the transaction terminal according to the ID of the transaction terminal comprises:
 determining a system ID corresponding to the transaction terminal according to the ID of the transaction terminal, wherein the system ID comprises the ID and registration time information of the transaction terminal; and
 issuing the ID key of the transaction terminal according to the system ID and a system master key; and
operating on privacy data of the transaction terminal based on the ID key of the transaction terminal, the ID of the transaction terminal including an account address.

19. One or more computer readable media storing thereon computer-readable instructions that, when executed by one or more processors, cause the one or more processors to perform acts comprising:
acquiring an identification (ID) key of a transaction terminal issued by a regulatory terminal, wherein the regulatory terminal is configured to determine a system ID corresponding to the transaction terminal according to an ID of the transaction terminal, and issue the ID key of the transaction terminal according to the system ID and a system master key, wherein the system ID comprises an ID and registration time information of the transaction terminal; and
operating on local privacy data according to the ID key of the transaction terminal, wherein the ID key is obtained from the ID of the transaction terminal, and the ID of the transaction terminal includes an account address.

* * * * *